United States Patent
Willis

(10) Patent No.: US 11,702,123 B1
(45) Date of Patent: Jul. 18, 2023

(54) BRAKING AND STEERING CONTROL APPARATUS FOR SECURING AND MOVING AN OBJECT ON A SURFACE

(71) Applicant: Douglas G. Willis, Fresno, CA (US)

(72) Inventor: Douglas G. Willis, Fresno, CA (US)

( * ) Notice: Subject to any disclaimer, the term of this patent is extended or adjusted under 35 U.S.C. 154(b) by 0 days.

(21) Appl. No.: 17/974,475

(22) Filed: Oct. 26, 2022

Related U.S. Application Data

(63) Continuation-in-part of application No. 17/527,158, filed on Nov. 15, 2021.
(60) Provisional application No. 63/113,783, filed on Nov. 13, 2020.

(51) Int. Cl.
*B62B 5/00* (2006.01)
*B62B 5/04* (2006.01)

(52) U.S. Cl.
CPC .......... *B62B 5/0086* (2013.01); *B62B 5/0093* (2013.01); *B62B 5/049* (2013.01); *B62B 5/0433* (2013.01); *B62B 2202/10* (2013.01); *B62B 2301/04* (2013.01)

(58) Field of Classification Search
CPC ... B62B 5/0086; B62B 5/0093; B62B 5/0433; B62B 5/049; B62B 2202/10; B62B 2301/04
See application file for complete search history.

(56) References Cited

U.S. PATENT DOCUMENTS

| | | | |
|---|---|---|---|
| 6,505,365 B1 * | 1/2003 | Hanson | A61G 7/053 5/613 |
| 2008/0111329 A1 * | 5/2008 | Brown | B60D 1/143 280/33.997 |
| 2009/0276977 A1 * | 11/2009 | Liao | B60B 33/0018 16/35 R |

* cited by examiner

*Primary Examiner* — Bryan A Evans
(74) *Attorney, Agent, or Firm* — Richard A. Ryan

(57) ABSTRACT

A braking and steering control apparatus to help a user stop, secure and move an object across a surface. The apparatus is particularly useful for securing and moving objects that are moveably supported on the surface by a wheel assembly, such as a caster, carriage and wheel float. The apparatus attaches to or is integral with a wheel assembly, an object or an item associated with the object. The apparatus has a wheeled action arm assembly, a reaction arm and a plurality of levers, links and pedals that are pivotally connected to the action arm assembly and reaction arm that allow the user to select whether the apparatus will allow safe, easy movement of an object or whether the object will be safely and effectively secured on a surface. The user selects the braking or steering operation and operates the controls using one of his or her feet.

20 Claims, 24 Drawing Sheets

BRAKING AND STEERING CONTROL APPARATUS FOR SECURING AND MOVING AN OBJECT ON A SURFACE

CROSS-REFERENCE TO RELATED APPLICATIONS

This patent application is a continuation-in-part of U.S. patent application Ser. No. 17/527,158 filed Nov. 15, 2021, which claims priority to U.S. Provisional Patent Application Ser. No. 63/113,783 filed Nov. 13, 2020.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to controlling the movement of an object that is moveably supported by one or more wheel assemblies which are utilized to move the object across a surface. In particular, the present invention relates to braking and steering control apparatuses that are specially configured for use to secure or move an object that is moveably supported by one or more wheel assemblies on a surface in order to provide improved braking and steering control as the object is secured in place on or moved across the surface. Even more particularly the present invention relates to such braking and steering control apparatuses that are configured to allow a user to easily and effectively control the braking and steering of an object, particularly a large, heavy and sensitive object, that is secured on or moved across a surface that may have uneven areas and non-planar obstructions.

B. Background

Casters, carriage assemblies and wheel floats, typically comprising one or more casters, are generally well known and commonly utilized to assist in moving an object from one location to another across a surface. Such casters, carriage assemblies, wheel floats and the like are collectively referred to herein as a "wheel assembly" or "wheel assemblies". A typical conventional wheel assembly is attached to, integral with or otherwise configured to support a frame or the like on which an object rests or is attached in a manner that allows the user to move the object with much less effort than would otherwise be required. In some circumstances, a wheel assembly directly attaches to or otherwise supports an object as the object is moved across a surface. Wheel assemblies are utilized in numerous types of industry, in the home, in the medical field and, generally, anywhere it is either necessary or desirable to efficiently and safely move an object across a surface. In particular, wheel assemblies are very beneficial for moving large, heavy and sensitive objects across a surface. For instance, airplane, automobile and other vehicle factories commonly utilize wheel assemblies to move engines, frames, transmissions and other large, heavy and relatively sensitive components from one part of a factory to another in a manner that limits the potential of injury to workers and damage to the object or to other equipment and objects in the factory.

Although conventional wheel assemblies, as well as individual casters, tend to function well on smooth surfaces, they generally do not function very well on surfaces that are uneven and/or irregular. Even surfaces that appear to be planar will often, if not usually, have areas where the surface is not planar. For instance, many concrete or other hard, relatively smooth surfaces have one or more expansion joints, door jambs and tracks, markings and the like that must be passed over or crossed in order to move the object, often moveably supported by one or more wheel assemblies, across the surface. In addition, conventional wheel assemblies also tend not to function very well on surfaces that have small obstructions, such as rocks, screws, bolts and the like, on the surface in the path where a wheel of the carriage assembly or caster will traverse. As well known in the relevant art, such obstructions are commonly found on factory and other floors. Unfortunately, as is also generally well known, when one or more wheels of certain wheel assemblies attempt to move over an uneven or irregular area of the surface or a small obstruction on the surface, the wheel tends to have difficulty crossing the area or obstruction. The difficulty of moving across such an area or over such an obstruction is significantly compounded when the load is heavy. Such difficulty can substantially decrease the safe and efficient operation of moving the object.

In addition to the loss of efficiency, problems associated with moving a heavy object across a surface on a frame or the like supported above the surface by conventional wheel assemblies include the risk of tipping due to the assembly being inherently unstable on uneven and irregular surfaces and surfaces having small obstructions. The risk of tipping is substantially increased when changing directions and when the wheel assemblies encounter something on the surface that tends to restrict travel in the desired direction. Various wheel assemblies have been devised which are better adapted to move an object, particularly a heavy object, across an uneven or irregular surface and over obstructions on the surface. One such prior art caster is set forth in U.S. Pat. No. 5,507,069 to Willis, the inventor of the present invention. This patent describes an articulated caster having a base assembly with three or more wheels attached thereto and extending radially from the center of the base and a pivot arm having a housing at a lower end that is received in a recessed area of the base. The upper end of the pivot arm connects to the apparatus using the caster. The pivot housing includes a spherical chamber that contains a pivot ball. A pivot shaft passes through a pivot hole in the pivot ball, an angled slot in the housing and through a pair of pivot shaft holes provided in the opposing walls of the base recess area. The pivot holes are disposed as low as possible for improved stability. U.S. Pat. Nos. 7,146,683, 7,500,285 and 7,506,405 (all to Willis, the present inventor), describe an articulated caster comprising a base assembly, at least three wheels pivotally attached to the base assembly, a pivot arm having an upper end configured to attach to an object to be moved and a universal joint at a lower end of the pivot arm that is attached to the base and configured for pivotal motion about two perpendicular axes. A brake assembly, attached to the pivot arm, is configured to force a brake pad into frictional engagement with a surface to place the brake assembly in its engaged position. These patents also describe combining multiple casters together to form a compound carriage system to support larger and/or heavier loads without excessive elevation of such loads and describe a carriage system wherein the load is carried on a load supporting section of a frame between pairs of carriages.

An improved articulating carriage that solves many of the problems identified above with prior art wheel assemblies is set forth in U.S. Pat. No. 9,950,564 (the "564 Patent") to Willis, the inventor of the present application. The '564 Patent describes an articulating carriage that is specially configured to support an object, particularly a heavy object, so as to facilitate safe and efficient movement of the object across a surface area having one or more non-planar obstructions. The walking beam of the articulating carriage pivotally supports a pedestal, which provides a support surface to support the object. The walking beam, which has a base plate, wheeled casters and a pair of spaced apart hangers having articulation openings, pivots relative to the pedestal as the object passes over the non-planar obstructions. The '564 Patent also describes an articulating carriage having a pair of walking beam assemblies that are connected by a crosstube that pivotally supports the pedestal, an articulating carriage with a major crosstube assembly that connects a pair of crosstubes to define a carriage having four walking beams and an articulating carriage having a compound crosstube assembly that connects pairs of major crosstube assemblies to define a carriage having eight walking beams.

An improved wheel float that also solves the problems identified above with regard to prior art wheel assemblies is set forth in U.S. Pat. No. 9,744,807 (the "807 Patent") to Willis, the inventor of the present application. The '807 Patent describes a wheel float that articulates in multiple directions for efficiently and safely moving an object across a surface having a non-planar obstruction. The wheel float has a pair of walking beam assemblies, a crosstube assembly having a crosstube interconnecting the walking beam assemblies, a pedestal supported by the crosstube and a center pivot assembly that allows the crosstube assembly to pivot relative to the pedestal. The pedestal has a support surface that supports the object above the walking beam assemblies. Each walking beam assembly has a base plate, wheeled casters, a pair of spaced apart hangers and a bushing assembly associated with an articulation opening in each of the hangers. Pivot members at the ends of the crosstube assembly engage the hanger bushings to allow the respective walking beam assembly to pivot relative to the crosstube.

While the above patents represent a substantial improvement over prior art wheel assemblies, there are still issues with regard to moving an object, particularly a large, heavy and sensitive object, across a surface, whether or not that surface has non-planar obstructions. Specifically, as well known in the art, when the object is supported by one or more wheel assemblies, the user or users have to push and/or pull the object across the surface in a controllable manner in order to safely and efficiently guide the object from the location where the object is at to the location where the object needs to be placed. Ideally, the one or more wheel assemblies make moving the object across a surface much easier, however, the ease of this movement and the weight and/or size of the object can make it difficult for the user to be able to control the directional movement of the object (and wheel assemblies) and to stop the movement of the object when desired or necessary. As is readily appreciated by persons who have to move large, heavy objects across a surface, the size and weight of the object tends to create a certain amount of momentum that can cause the object to drift off the intended path and/or continue moving when the user wants to stop the object. This problem is amplified when the surface is inclined and/or non-planar. The failure to adequately control the moving and stopping of an object, particularly large, heavy objects that are of a sensitive nature, can result in the object colliding with and injuring people and/or damaging the object, equipment, supplies and/or other objects. As will be readily appreciated by persons who have to move such objects, injuring persons and/or damaging the object, equipment, supplies or other objects can result in significant financial costs for the persons or company moving the object.

What is needed, therefore, is an apparatus for allowing a user to safely and effectively control the braking and directional movement of an object that is moveably supported above a surface by one or more wheel assemblies, including casters, carriage assemblies, wheel floats and the like. More specifically, what is needed is a new braking and steering control apparatus that allows a user to safely and effectively stop the movement of an object, prevent any undesired movement of the object and controllably steer the object as it is moved across a surface. The new braking and steering control apparatus should be easy to use and readily adaptable for use with a wide variety of different types of objects and wheel assemblies that are beneficially utilized to move an object, particularly large, heavy, and sensitive objects, across a surface. The new braking and steering apparatus should allow the user to effectively stop an object that is being moved, secure the object in a desired location to prevent any further movement of the object until the user desires for the object to be moved, and to allow the user to effectively, efficiently and safely controllably steer the object across the surface. Preferably, the braking and steering control apparatus should be configured such that it can be assembled without machining, welding or break bending of any components to reduce the cost of such assembly and the need for expensive skilled labor.

SUMMARY OF THE INVENTION

The following presents a simplified summary of the disclosure of the present invention in order to provide a basic understanding of the invention to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later.

The use of terms such as "including", "comprising" or "having" and variations thereof herein is meant to encompass the items listed thereafter and equivalents thereof. The terms "a" and "an" herein do not denote a limitation of quantity, but rather denote the presence of at least one of the referenced items. Further, the use of terms "first", "second", and "third", and the like, herein do not denote any order, quantity, or importance, but rather are used to distinguish one element or feature of an element from another. The term "and/or," when used herein with a list of two or more items, means that any one of the listed items can be employed by itself, or any combination of two or more of the listed items can be employed.

The new braking and steering control apparatus (also referred to as the "apparatus") of the present invention provides the various benefits and solves the problems that are identified above. That is to say, the present invention is directed to a braking and steering control apparatus for helping a user control the movement or non-movement of an object, particularly a large and/or heavy object, whether of a sensitive (i.e., fragile, expensive or critical) nature or not across a surface. More specifically, the present invention discloses a braking and steering control apparatus for allowing a user to safely and effectively control the braking and directional movement of an object that is moveably supported above a surface by one or more wheel assemblies, including casters, carriage assemblies, wheel floats and the like. The new braking and steering control apparatus allows the user to safely stop the movement of an object, effectively secure the object in a desired location by preventing any undesired movement of the object, and controllably steer the object as it is moved across a surface. The new braking and steering control apparatus is easy to use and readily adaptable for use with a wide variety of different types of wheel assemblies that can be beneficially utilized to move an object, particularly a large, heavy, sensitive object, across a surface. The braking and steering apparatus allows the user to securely stop a wheel assembly being utilized to move an object, prevent any further movement of the wheel assembly until the user desires for the object to be moved, and effectively, efficiently and safely controllably steer the wheel assembly across the surface in a manner that prevents collisions with people, equipment and other objects.

In the preferred configurations of the new braking and steering control apparatus of the present invention, the apparatus is assembled without the need for machining, welding or break bending of any components so as to reduce the cost of such assembly and the need for expensive skilled labor. In a preferred configuration of manufacturing the new braking and steering apparatus, all of the materials can be common and off-the-shelf metal plate, tubing, and pipe, nuts, bolts, washers (including conical washers), block rubber, stock wheels, and the like. This feature helps facilitate relatively low expense of manufacturing the apparatus and the ease of custom designing the apparatus for specific object moving applications.

In a typical use, the new braking and steering control apparatus is utilized with an object that is moveably supported on a surface by one or more wheel assemblies, such as casters, carriage assemblies, wheel floats and the like, that are configured to moveably support the object. In some embodiments, the apparatus of the present invention is directly attached to or integral with the object or attached to or integral with a wheel assembly that is being utilized to moveably support the object so it can be secured on a surface and safely and efficiently moved across the surface, even surfaces with non-planar areas or obstructions. As set forth in the Background, moving an object across a surface, particularly large, heavy, sensitive objects, using one or more wheel assemblies that are configured to make the object easier to traverse the surface, can create issues with regard to being able to effectively and safely stop the object, maintain the object in a stopped condition and control the steering movement of the object as it is moved. As also set forth above, failure to secure the object in a stopped position or to controllably move the object across a surface can create the potential of injuring people and/or colliding with equipment or other objects, which can damage the equipment, the other objects or the object being moved, all of which can result in significant harm and/or significant repair or replacement costs. The new braking and steering apparatus of the present invention helps the user to prevent such harm and losses by being able to easily, effectively and safely stop the object, prevent undesired movement of the object and controllably steer the object.

In a general embodiment of the braking and steering control apparatus of the present invention generally comprises an action arm assembly, a control group, a reaction arm, an engagement spring assembly and a brake assembly that function together to allow a user to move an object, which is moveably supported by one or more wheel assemblies, across a floor or other surface. The action arm assembly rotatably supports a wheel that is configured to engage and roll on the surface when the apparatus is in a steering condition to assist the user with moving the object on the surface. The control group is operatively connected to the action arm assembly and positioned so as to define a first end of the apparatus. The control group has a plurality of pedals that are operatively connected to the action arm assembly to allow the user to selectively place the apparatus in one of the steering condition and a braking condition. The pedals are accessed by the user, typically using his or her foot, to control the movement or non-movement of the object on the surface. The reaction arm interconnects the action arm assembly with the a wheel assembly or an object at a second end of the apparatus. The action arm assembly is pivotally connected to the reaction arm. The engagement spring assembly is attached to the reaction arm and configured to bias the reaction arm downward to place the apparatus in position for being placed in either the steering condition or the braking condition. The brake assembly is attached to the action arm assembly and pivotally connected to the control group. The brake assembly is structured and arranged to engage the surface and prevent movement of the apparatus and the object on the surface when the apparatus is in the braking condition and the apparatus is attached to or integral with the object. In use, each of the plurality of pedals of the control group are pivotally connected to the action arm assembly and configured to allow the user to raise and lower the action arm assembly and, therefore, the wheel and the braking assembly. The pedals of the control group are also configured to allow the user to raise or lower the brake assembly relative to the wheel to selectively place the apparatus in one of the steering condition and the braking condition. In the steering condition, the wheel is in position against the surface to allow the user to move the apparatus and object on the surface. In the braking condition, a downward force is applied to the brake assembly to place the brake assembly in a fully locked position and secure the apparatus and object in place on the surface.

In the preferred configuration, the apparatus further comprises a return spring assembly that interconnects the action arm assembly and the reaction arm. The return spring assembly has a return spring that is configured to bias the action arm assembly relative to the reaction arm so as to pivot the action arm assembly generally upward away from the surface when the apparatus is in neither of the steering condition nor the braking condition and generally downward toward the surface for placement of the apparatus in one of the steering condition and the braking condition. Also in a preferred configuration, the control group comprises an application pedal assembly, a selector lever assembly and a release pedal assembly that are each pivotally connected to the action arm assembly and are operatively configured to selectively place the apparatus in one of the steering condition and the braking condition. The application pedal assembly is pivotally connected to the action arm assembly so as to raise and lower the action arm assembly and each of the wheel and the braking assembly. The selector lever assembly is pivotally connected to the action arm assembly and configured to engage the brake assembly so as to apply a downward force thereto to place the apparatus in the braking condition with the brake assembly in the fully locked position. The release pedal assembly is pivotally connected to each of the action arm assembly and the reaction arm to raise or lower the brake assembly relative to the wheel to select one of the steering condition and the braking condition.

The apparatus is structured and arranged to press the wheel against the surface when the apparatus is in the steering condition and to press one or more brake pads of the brake assembly against the surface when the apparatus is in the braking condition. The control group has a selector lever assembly that is pivotally attached to the action arm assembly, with the brake assembly and the selector lever assembly being cooperatively configured and positioned so the selector lever assembly will engage the brake assembly and press one or more brake pads thereof downward against the surface to secure the apparatus in the braking condition. In a preferred configuration, the brake assembly comprises a brake beam that is pivotally attached to the action arm assembly and a pressure plate that is attached to or integral with the brake beam, with the selector lever assembly being structured and arranged to press down on the pressure plate to press the one or more brake pads against the surface. A tension application link pivotally interconnects the application pedal assembly of the control group and each of the action arm assembly and the reaction arm. Typically, a connecting assembly is attached to or integral with one of the apparatus, the object and the wheel assembly and the reaction arm connects to the connecting assembly so as to allow a user to control the movement of the wheel assembly and/or the object on the surface.

The apparatus further comprises a selection position indicator that is supported on the action arm assembly and operatively connected to an indicator actuator which is associated with the brake assembly, with the selection position indicator being structured and arranged to indicate that the apparatus is in one of the braking condition and the steering condition. The various levers and links of the apparatus are operatively configured to cooperate with the control group and the brake assembly so as to utilize over-the-center positioning of one or more of the levers and links to secure the brake assembly in one of a fully released position for movement of the apparatus and object on the surface when the apparatus is in the steering condition and a fully locked position for securing the apparatus on the surface when the apparatus is in the braking condition.

Accordingly, the primary object of the present invention is to provide a braking and steering control apparatus that has the various advantages discussed above and elsewhere in the present disclosure and which will overcome the various disadvantages and limitations that are associated with presently available apparatuses and systems for braking and steering an object across a surface.

It is an important objective of the present invention to provide a new braking and steering control apparatus that can be beneficially utilized to secure or move an object, particularly a large, heavy, sensitive object, that is moveably supported on a surface by one or more wheel assemblies that are being utilized to move the object across the surface.

An important aspect of the present invention is that it provides a new braking and steering control apparatus which accomplishes the above-described objectives.

Another important aspect of the present invention is that it provides a new braking and steering control apparatus which allows the user thereof to, as he or she desires, secure an object on a surface and move the object across the surface in a manner which is more efficient, effective and safe than prior art braking and steering control apparatuses.

Another important aspect of the present invention is that it provides a new braking and steering control apparatus which is particularly beneficial for use with securing and controllably moving an object, particularly a large, heavy and sensitive object, that is moveably supported on a surface by one or more wheel assemblies, which are utilized allow a user to more easily push or pull the object across the surface, in a manner that reduces the likelihood of the object colliding with people, equipment and/or other objects.

Another important aspect of the present invention is that it provides a new braking and steering control apparatus which can be attached to or otherwise associated with an object that is to be secured on or moved across a surface or to a wheel assembly which is utilized to moveably support the object on the surface.

Another important aspect of the present invention is that it provides a new braking and steering control apparatus which is easy to operate, adaptable for use with a wide variety of different wheel assemblies to secure or controllably move a wide variety of objects on a surface, and effective for maintaining the object in a stopped position or moving the object in a manner which significantly reduces the likelihood of the object colliding with people, equipment and/or other objects.

Another important aspect of the present invention is that it provides a new braking and steering control apparatus which is structured and arranged to allow the user to easily and quickly, using only one of his or her feet, to switch the apparatus between its steering mode to controllably and safely guide an object across a surface and its braking mode to secure the object on the surface.

Another important aspect of the present invention is that it provides a new braking and steering control apparatus which comprises a plurality of levers, links, arms and spring assemblies that engage a guide wheel with a surface on which an object is to be moved to improve a user's ability to controllably steer the object and a brake assembly having one or more brake pads that securely engage the surface to secure the object at a desired position on the surface.

Yet another important aspect of the present invention is that it provides a new braking and steering control apparatus which can be assembled without machining, welding or break bending any components so as to reduce the cost of such assembly and the need for expensive skilled labor.

As will be explained in greater detail by reference to the attached figures and the description of the preferred embodiments which follows, the above and other objects and aspects are accomplished or provided by the present invention. As set forth herein and will be readily appreciated by those persons who are skilled in the relevant art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. As will be readily understood and appreciated by persons who are skilled in the relevant art, the scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

Figure 1:
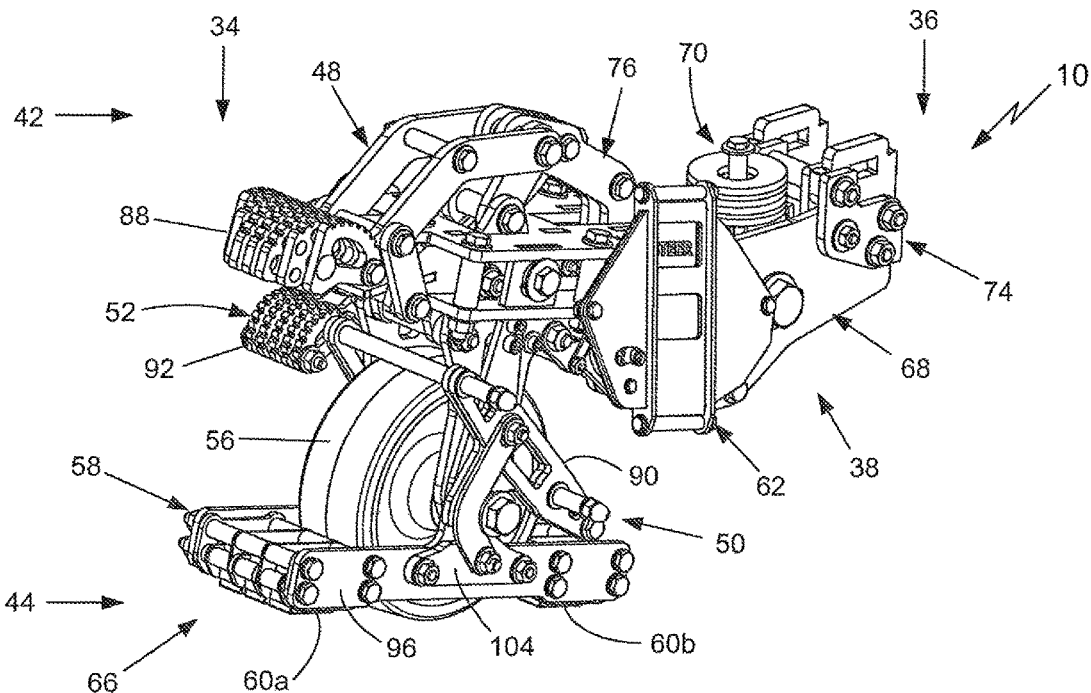
FIG. 1 is a left side perspective view of a preferred embodiment of the braking and steering control apparatus of the present invention configured for attachment to a wheel assembly shown with the selection position indicator in its steer position.

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular configurations for the new braking and steering apparatus of the present invention and exemplary objects and wheel assemblies with which the new braking and steering apparatus can be utilized, persons who are skilled in the relevant art will readily appreciate that the present invention is not so limited. In addition, the embodiments of the new braking and steering apparatus set forth herein are shown and described with only those components which are required to disclose the present invention. Many of the necessary components for manufacturing and using the present invention are not shown in the drawings or necessarily described below, but which are well known to persons who are skilled in the relevant art. As will be readily appreciated by such persons, the various elements of the present invention that are described below may take on any form consistent with forms which are readily realized by one of ordinary skill in the art having knowledge of braking and steering devices and apparatuses for securing and moving an object, particularly very large, heavy and sensitive objects on or across a surface, including those having uneven areas and/or non-planar obstructions.

Figure 7:
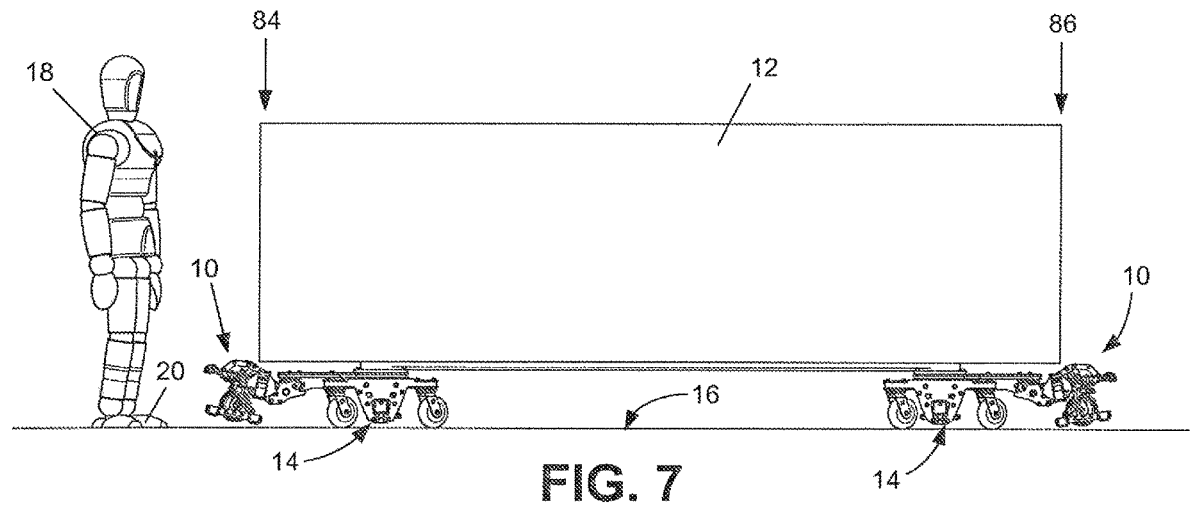
FIG. 7 is a left side view of an object that is moveably and controllably supported on a surface by the wheel float and attached braking and steering control apparatus of FIG. 6 at each of the front end and the back end of the object with a user standing near the apparatus at the back end of the object to move the object.
Figure 8:
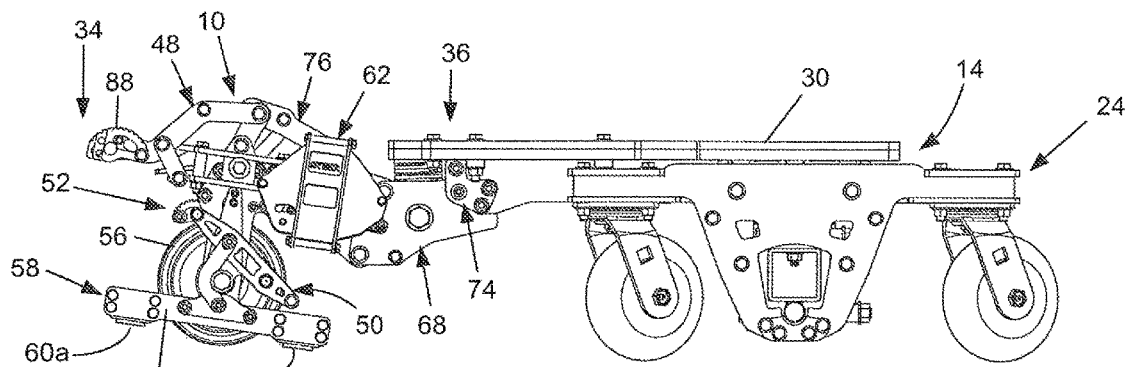
FIG. 8 is a left side view of the braking and steering control apparatus and wheel float at the back end of the object of FIG. 7.
Figure 9:
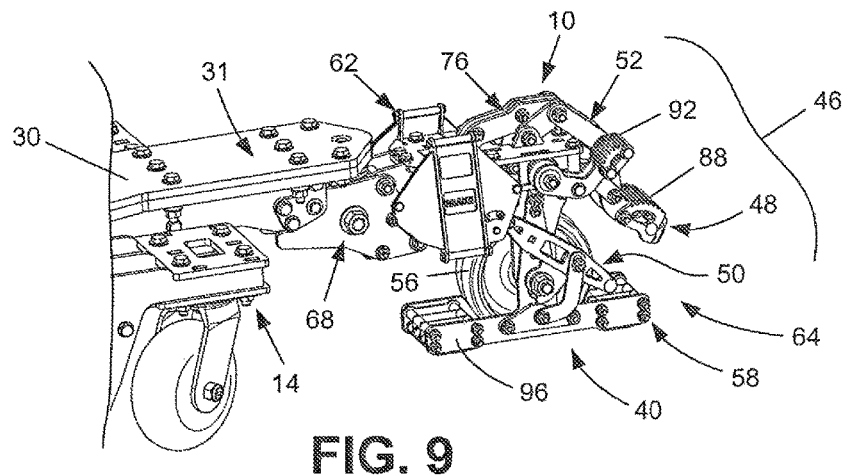
FIG. 9 is a right side perspective view of the braking and steering apparatus and wheel float at the front end of the object of FIG. 7.

A new braking and steering apparatus that is configured pursuant to one of the preferred embodiments of the present invention is shown generally as in FIGS. 1-24. An exemplary object with which the new apparatus 10 can be utilized is shown generally as 12 in FIG. 7. Exemplary wheel assemblies with which the new apparatus 10 can be utilized to moveably support the object 12 are best shown generally as 14 in FIGS. 2-3 and 6-9. As set forth in the Background and Summary above, as well as being well known to those persons who are skilled in the relevant art, one or more wheel assemblies 14 are commonly utilized to help move an object 12 across a surface 16 by one or more users 18, as shown in FIG. 7. The wheel assemblies 14 with which the new apparatus 10 can be utilized are attached to, integral with or otherwise associated with the object 12. The braking and steering apparatus 10 of the present invention will help the user 18 to easily, effectively and safely secure the object 12 on the surface 16, controllably steer the object 12 as it moves across the surface 16 when using the one or more wheel assemblies 14 and easily and safely stop the movement of the object 12 so it may be secured in place on surface 16. The new apparatus 10 can assist with moving and securing an object 12 whether the apparatus 10 is attached directly to the object 12 or the apparatus 10 is attached to or integral with a wheel assembly 14 that is associated with the object 12. As set forth in more detail below, the various operative components of the new apparatus 10 are configured so as to be selected and engaged by the user's foot 20, as shown in FIGS. 12-18 and 21-23. More specifically, once the braking function is fully engaged by the user 18, the new apparatus 10 secures an object 12 that is moveably supported on the surface 16 (e.g., by one or more wheel assemblies 14) in place on the surface 16. Once the steering function is engaged, the new apparatus 10 allows the user 18 to move the object 12 across the surface 16, such as via the wheel assemblies 14, in a manner that will substantially reduce the likelihood of the object 12 colliding with other persons, equipment, materials and/or other objects.

The new braking and steering apparatus 10 of the present invention is readily adaptable for use with a wide variety of different types, sizes and weights of objects 12. Persons who are skilled in the relevant art will readily appreciate that the new apparatus 10 is likely to be most beneficial when the user 18 needs to move and secure large, heavy and sensitive objects 12, such as components that are associated with aircraft, rockets, ships and the like. As well known, these types of objects 12 are often moved across a factory floor or other surface 16 from one assembly position to another or to where the object 12 will be utilized or sent out for delivery. In addition to frequently being large and heavy, which complicates movement of these objects across the surface 16, these objects 12 tend to be very sensitive to damage that could result from colliding with other objects, materials, equipment or the like. For instance, damage to such objects could require very expensive repairs and create supply chain problems while the object 12 is being repaired or replaced, including delivery of the final product with which the object 12 was or will be utilized with or incorporated within. In addition, typically these objects 12 are also very sensitive with regard to the nature of the intended use of the final product, such that any undetected damage to the object 12 can result in catastrophic failures or other problems with regard to the product itself.

The new braking and steering apparatus 10 of the present invention is also readily adaptable for use with a wide variety of styles and different types of wheel assemblies 14 that are or may be utilized to assist with moving an object 12 across a surface 16, such as a factory floor or the like. For instance, the wheel assemblies 14 can be casters, carriage assemblies, wheel floats and the like that are suitable for moving an object 12 across a surface 16. Examples of such wheel assemblies 14 are described in the various patents identified in the Background (namely: U.S. Pat. Nos. 5,507,069; 7,146,683; 7,500,285; 7,506,405; 9,950,564; and 9,744,807), all of which have the present inventor as the inventor—each of these patents is hereby incorporated herein by reference as though fully set forth in the present text. As such, the wheel assemblies 14 that are described herein and shown in the figures are only exemplary of types of wheel assemblies 14 that can be utilized to move an object 12 and with which the new apparatus 10 can be used to help stop, secure and move the object 12 and, therefore, the various example wheel assemblies 14 set forth in the present patent application are not intended to limit the present invention in any manner.

Certain drawings included herewith show a wheel float that is the subject of U.S. Pat. No. 9,744,867 to Willis (the present inventor), which is also incorporated herein by reference as though fully set forth in the present text, as the wheel assembly 14 which is being or can be utilized to moveably support the object 12 as it rests or moves across the surface 16. As set forth in the above patent, the example wheel float wheel assembly 14 has a first walking beam assembly 22, a second walking beam assembly 24 in spaced apart relation to the first walking beam assembly 22, a pedestal 26 positioned between the two walking beam assemblies 20/22 and a crosstube 28 disposed through and interconnecting the walking beam assemblies 20/22 and pedestal 26, as best shown in FIGS. 2-3 and 6-10. In FIGS. 2-5, the apparatus 10 is connected to one or more components of the pedestal 26 of the wheel assembly 14, such as to a mounting plate 30 of the wheel assembly 14. FIGS. 6-10 show the apparatus 10 connected to an outwardly extending section 31 (which can be of a customizable length) of the extended length mounting plate 30 of the pedestal 26. The outwardly extending section 31 of the mounting plate 30 is sized to allow the apparatus 10 to connect to a wheel assembly 14 that is positioned under the object 12 somewhat interior of an edge, such as first edge 84 or second edge 86 of the object 12, as best shown in FIG. 7. As will be readily appreciated by persons who are skilled in the relevant art, the apparatus 10 of the present invention can be fixedly or removably attached to a wheel assembly 14, integrally formed with a wheel assembly 14 or otherwise associated with the wheel assembly 14. Likewise, the new apparatus 10 can be attached to or formed with components of a wheel assembly 14 other than the pedestal 26, mounting plate 30 or the like. As will be readily appreciated by persons who are skilled in the subject art, the possible types of connections and location of the connections between the new apparatus 10 and the wheel assemblies 14 are likely to be nearly limitless.

Figure 11:
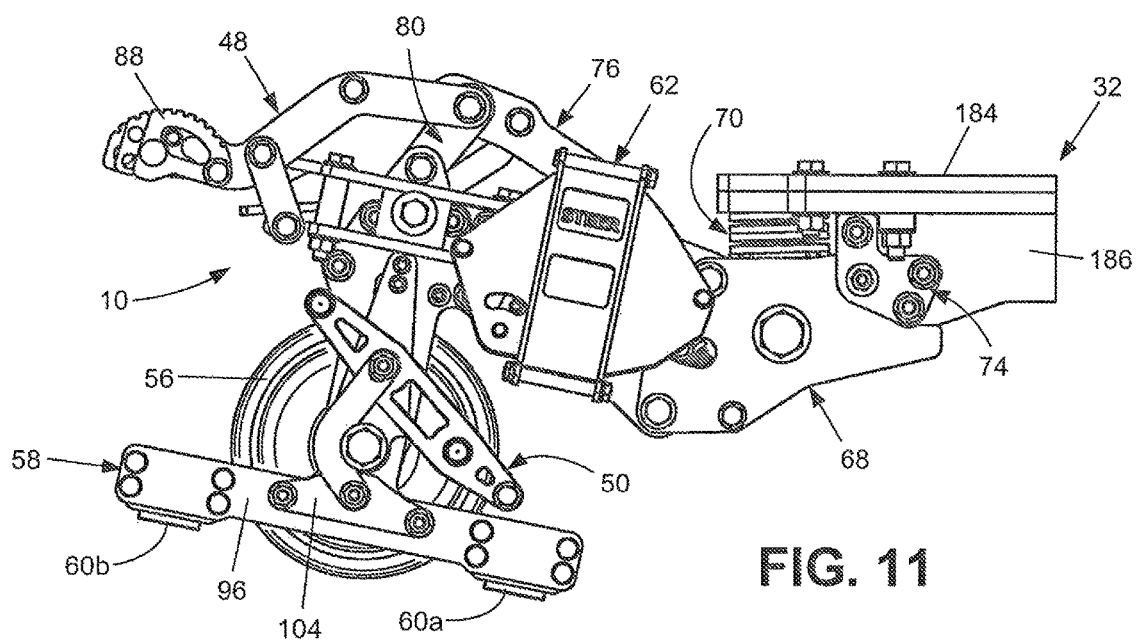
FIG. 11 is a left side view of the braking and steering apparatus of FIG. 1 configured with a connecting plate to attach the apparatus directly to an object without using a wheel assembly.
Figure 12:
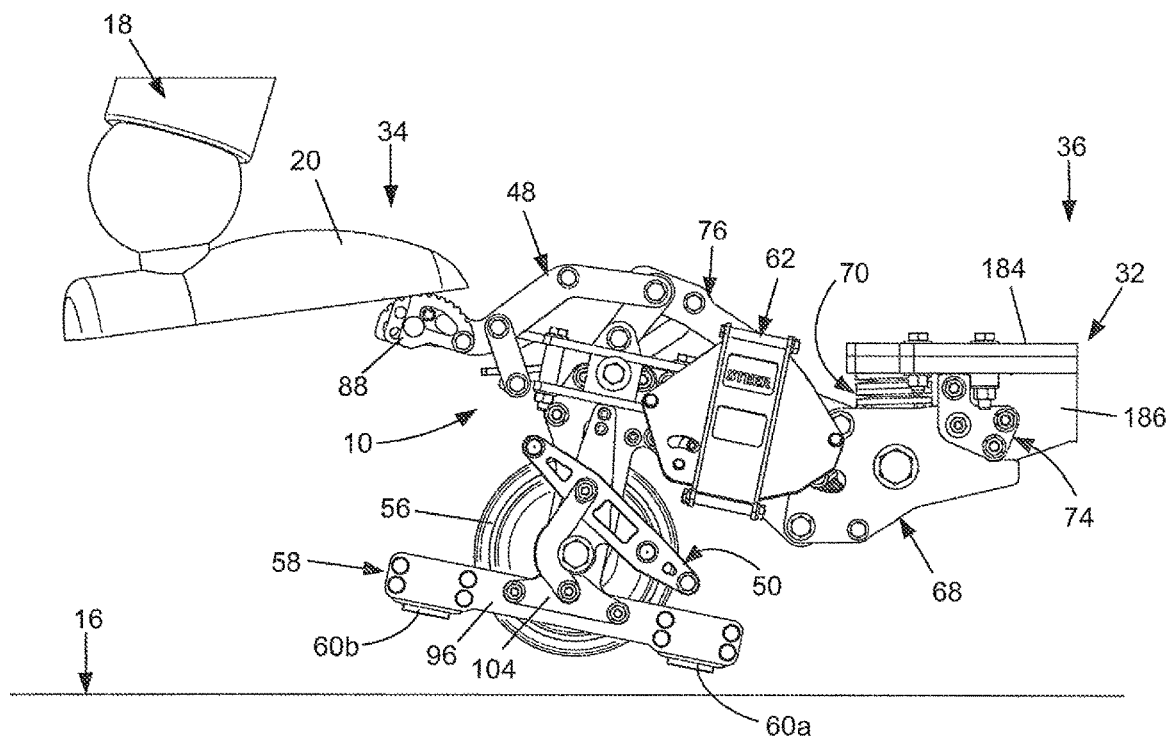
FIG. 12 is a left side view of the braking and steering apparatus of FIG. 11 showing the user's foot beginning to press down on the application pedal of the apparatus to lock the apparatus in its steering condition.
Figure 13:
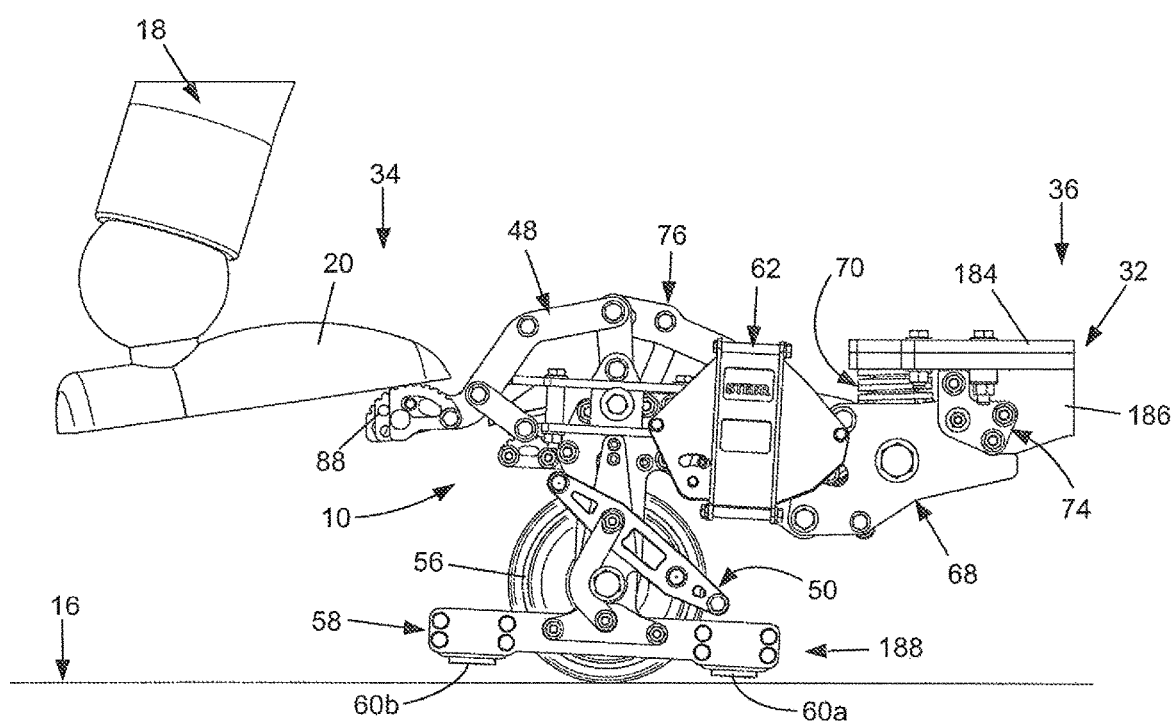
FIG. 13 is a left side view of the braking and steering apparatus of FIG. 12 showing the user's foot further pressing down on the application pedal of the apparatus with the wheel thereof making contact with the surface.

Alternatively, the new braking and steering control apparatus 10 can be attached directly to the object 12 or a component of the object 12, such as a frame, panel or the like, to controllably move the object 12 across the surface 16, typically while the object 12 is being moved with one or more wheel assemblies 14, or secure the object 12 in place on the surface 16. An example of the new apparatus 10 being configured to be connected directly to an object 12 or to a component that is associated with the object 12 is shown in FIG. 11. In this embodiment, an object connecting assembly 32, which has a plate that is similar to the mounting plate 30 of the pedestal 26 of the wheel float, is sized and configured to be connected or attached to the object 12 or to a support frame, panel or other component which is associated with the object 12, even if the component is only temporarily associated with object 12. Persons who are skilled in the relevant art will readily appreciate that a wide variety of different types, sizes and configurations for the object connecting assemblies 32 can be utilized with the new apparatus 10. Such persons will also readily appreciate that the object connecting assembly 32 may be connected to the object 12 in a wide variety of different manners, including using connecting elements such as screws, bolts and the like, adhesives, or using a securing process such as welding or the like.

The braking and steering control apparatus 10 of the present invention has a plurality of foot-operated devices at a first end 34 of apparatus 10 (e.g., the end of apparatus 10 located near the user 18 so as to be engaged by the user 18), a connecting assembly 74 and an engagement spring assembly 70 at a back end 36 of apparatus 10 (e.g., the end of apparatus 10 where the apparatus 10 connects to an object 12 or wheel assembly 14), a first or left side 38, a second or right side 40, an upper side 42 and a lower side 44, as best shown in FIGS. 1, 3-4 and 8-9. For purposes of describing the use and relative location of the various components of the new braking and steering control apparatus 10 of the present invention and the use thereof, the terms "front", "forward", "forwardly" and the like are utilized to refer to the direction of the foot-operated pedals and where the user engages the apparatus 10 when securing or moving an object 12. The terms "back", "rearward", "rearwardly" and the like are utilized to refer to the direction of the apparatus 10 that connects to or is integral with a wheel assembly 14 or object 12 when securing or moving an object 12. The directions "left", "leftward", "right", "rightward" and the like refer to a direction from the perspective of a user 18 who is utilizing apparatus to move an object 12 on a surface 16. More specifically, the directions "left", "leftward" and the like refers to the side that faces toward the reader in FIGS. 9 and 21-35 and the terms "right", "rightward" and the like refers to the side facing toward the reader in FIGS. 1, 3-4, 8 and 12-18. Likewise, the terms "upward", "upwardly", "upper", "top" refer to the direction of the components of the apparatus 10 away from a surface 16 when the apparatus 10 is in use to secure or move an object 12 on the surface 16 and the terms "downward", "downwardly", "lower", "bottom" and the like refer to the direction of the components of the apparatus 10 toward or against the surface 16 when the apparatus 10 is in use on a surface 16 to secure or move an object 12 on the surface.

The new braking and steering control apparatus 10 of the present invention also generally comprises a control group 46 having an application pedal assembly 48, selector lever assembly 50 and a release pedal assembly 52, an action arm assembly 54 rotatably supporting a wheel 56, a brake assembly 58 comprising one or more brake pads 60 (such as first/forward brake pads 60a and second/rearward brake pads 60b), a selection position indicator 62 which indicates whether the apparatus 10 is in its braking condition 64 or its steering condition 66, a reaction arm 68, an engagement spring assembly 70 (with engagement spring 71), a return spring assembly 72 (with return spring 73) and a connecting assembly 74. In addition to its use to affect the operation of the apparatus 10 to secure or guide an object 12, the reaction arm 68 also functions as a spring housing that houses the engagement spring assembly 70. The reaction arm 68, by way of the connecting assembly 74, connects the apparatus 10 to a wheel assembly 14 or to an object 10 (typically by way of an object connecting assembly 32), as best shown in the exploded view of FIG. 10 and in FIGS. 40-48. As also shown in the figures, the new apparatus 10 comprises a plurality of links, such as the tension application link 76, the release link 78, the compression application link 80 and the selector links 82 (shown as first selector link 82a and second selector link 82b) that interconnect and allow pivoting of the various components set forth above, as also best shown in FIG. 10. As also set forth below and shown in the relevant figures, apparatus 10 also has a plurality of levers, plates, tubes, posts, rings, retainers and the like that interconnect and allow pivoting and other movement of the various components set forth above to either brake and secure or move an object 12.

Figure 10:
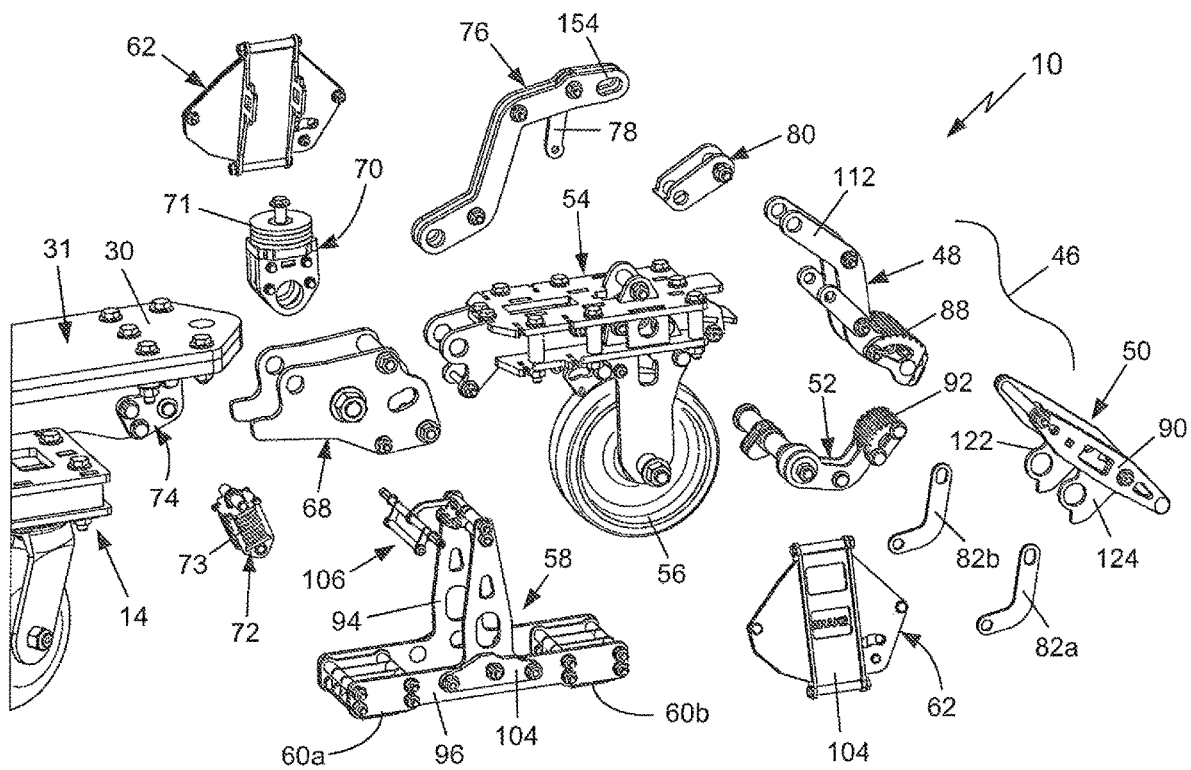
FIG. 10 is an exploded right side perspective view of the braking and steering apparatus of FIG. 9 showing the components thereof.
Figure 37:
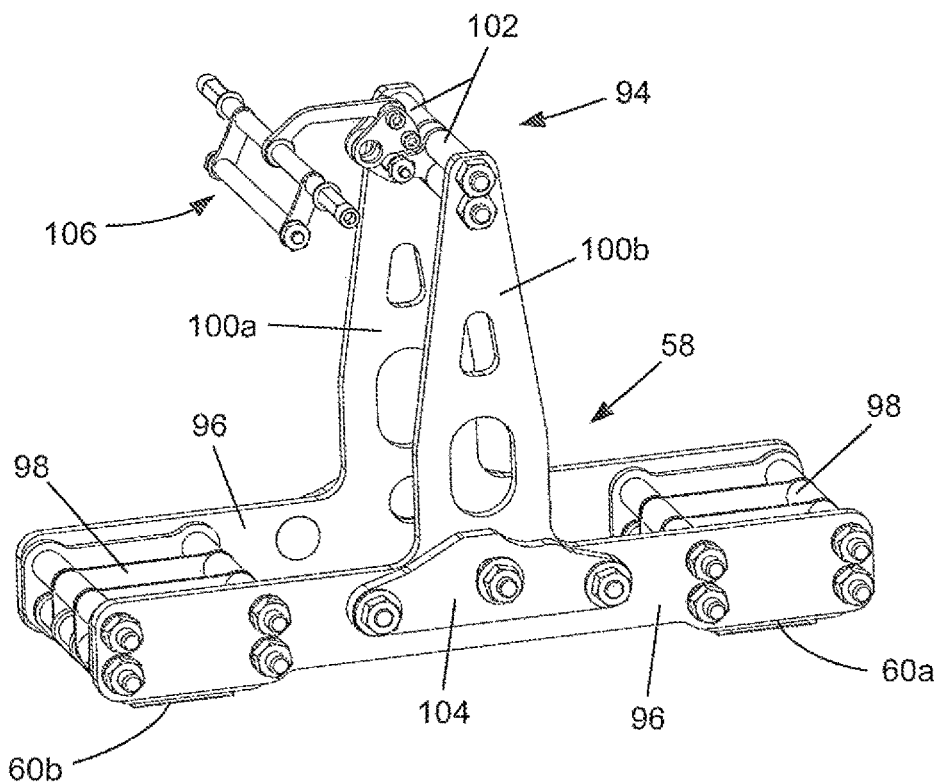
FIG. 37 is a right side perspective view of the brake assembly of the braking and steering control apparatus of FIG. 10 showing the selection position indicator actuator and bellcrank thereof.
Figure 38:
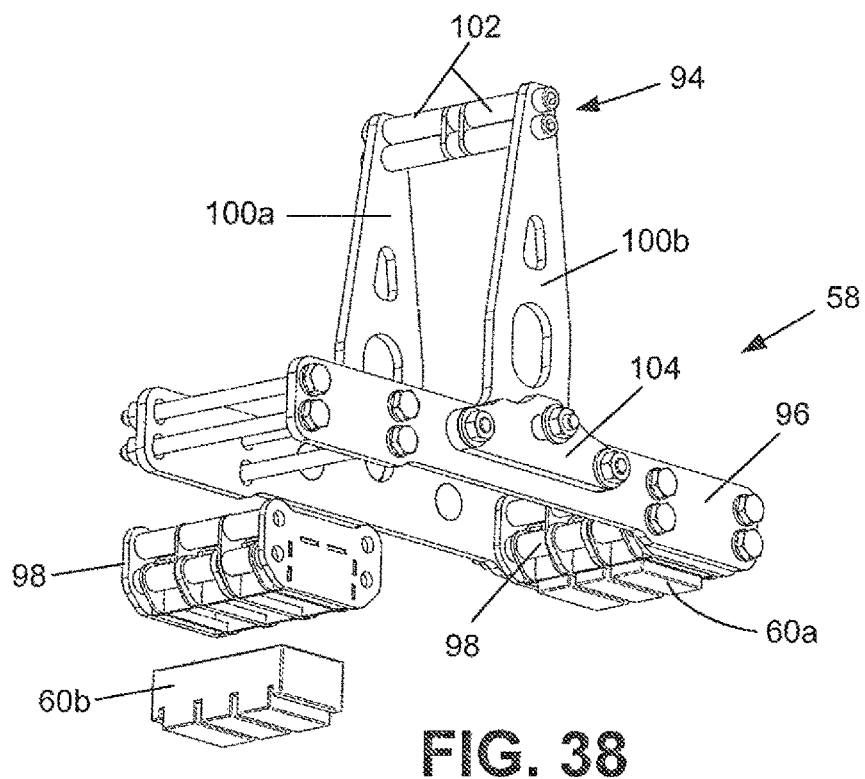
FIG. 38 is a partially exploded lower side perspective view of the brake assembly of FIG. 37, shown without the selection position indicator activator to particularly show the brake pad mount and brake pad thereof.
Figure 39:
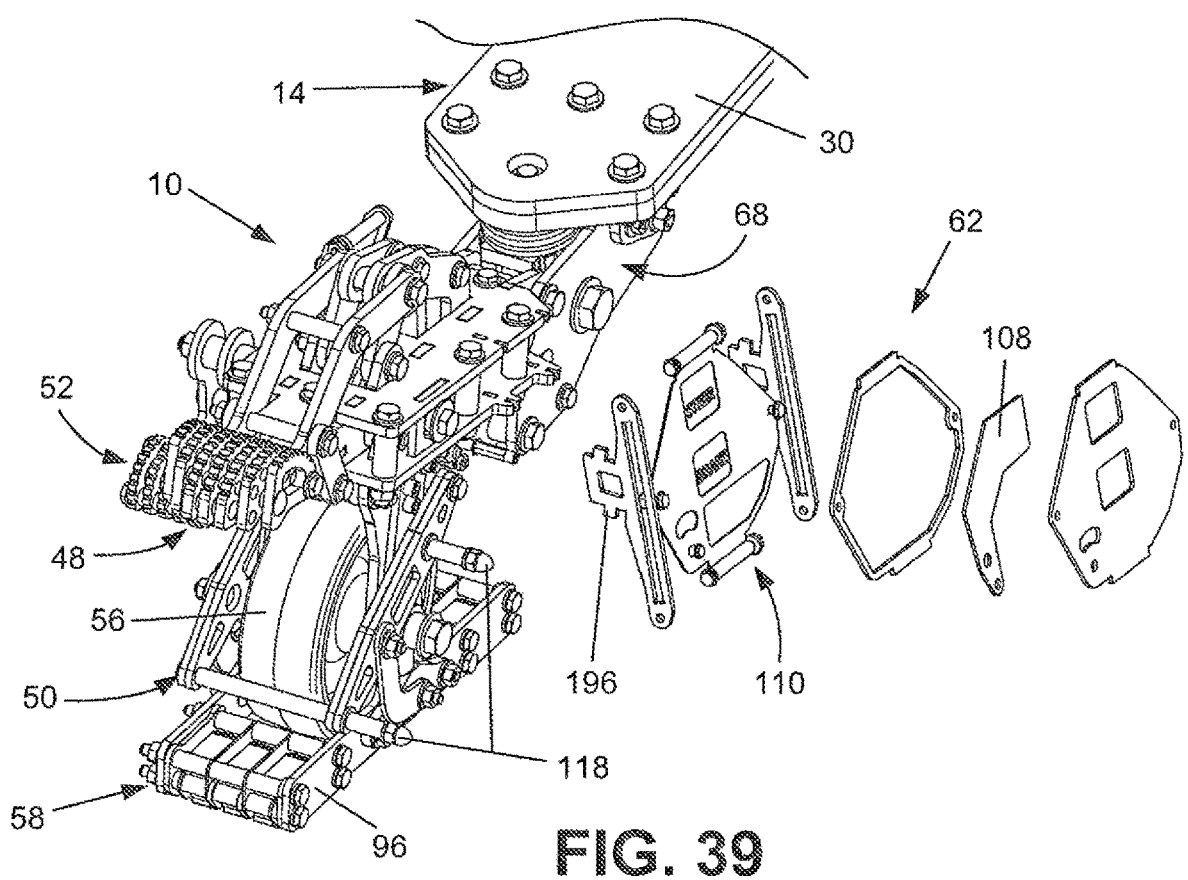
FIG. 39 is a partially exploded left side perspective view of the braking and steering control apparatus of FIG. 6 particularly showing the components of the selector position indicator.

As set forth above and shown in the figures, there are at least three basic configurations for use of the new apparatus 10 with an object 12 or wheel assembly 14, including: (1) separate attachment, namely, attachment of the apparatus 10 to the object 12 and/or a component that is supporting or otherwise associated with the object 12; (2) close attachment, namely, the apparatus 10 integrally formed with or attached to a wheel assembly 14; and (3) extended attachment, namely, the apparatus 10 being attached to or integrally formed with a customizable length of an outwardly extending section 31 of the mounting plate 30. As explained in more detail below, during use of the new apparatus 10, the user 18 engages the control group 46, comprising the application pedal assembly 48, selector lever assembly 50 and the release pedal assembly 52, to choose whether the apparatus 10 is to be used to hold the object 12 in place on the surface 16 or to allow the user 18 to move the object 12 across the surface 16 by pressing his or her foot 20 against, respectively, the application pedal 88 of the application pedal assembly 48, the selector lever 90 of the selector lever assembly 50 and the release pedal 92 of the release pedal assembly 52. The brake pads 60, which are supported by a brake assembly 58 having a bell crank 94 and a brake beam 96, as best shown in FIGS. 1, 7 and 37-38, are pressed against the surface 16 to stop or prevent movement of an object 12 (typically via a wheel assembly 14) and lifted off of the surface 16 to allow movement of the object 12 across the surface 16. The brake pads 60 are held in a brake pad holder 98 that is received in appropriately configured sections of the brake beam 96, as best shown in FIG. 38. The brake beam 96 is supported at the lower end of a pair of upwardly extending brake pylons 100a/100b, which are held in spaced apart relation at their upper end by pylon spacer tubes 102, as shown in FIG. 38. A pressure plate 104 is attached to or integral with each side of the brake beam 96, against which is applied pressure to push the brake assembly 58 downward to press the brake pads 60 against the surface 16. Pivotally attached to the upper end of the bell crank 94 is a selection positioned indicator actuator 106 that is connected to the selection position indicator assembly 62, which is utilized to place the apparatus 10 in one of its braking condition 64 and steering condition 66, to move the indicator shutter 108 to expose either the "steer" or "brake" panel of the selection indicator 110, as best shown in FIGS. 10, 37 and 39, to indicate to the user 18 the operating mode of the apparatus 10 (e.g., braking condition 64 or steering condition 66). As will be readily appreciated and understood by persons who are skilled in the relevant art, the various other mechanisms and words, symbols, colors or other devices can be utilized to indicate whether the apparatus 10 is in its braking condition 64 or in its steering condition 66.

Figure 49:
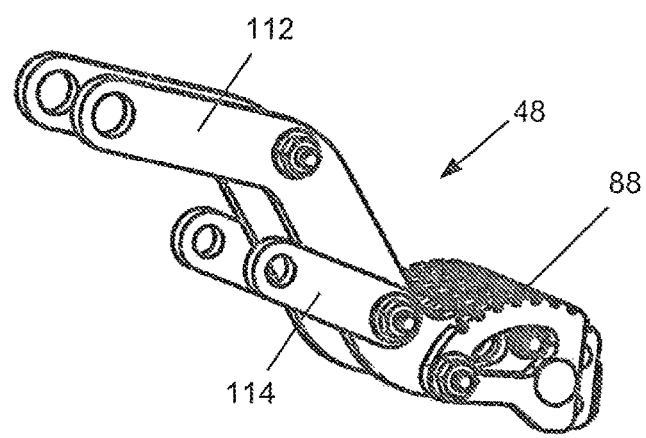
FIG. 49 side perspective view of the application pedal assembly of FIG. 10.

As set forth above and in more detail below, the application pedal assembly 48 has an application pedal 88 that is pressed by the user's foot 20 to transition the new apparatus 10 between the braking condition 64 that secures the apparatus 10, object 12 and, if connected to the apparatus 10 or object 12, wheel assembly 14 in place on a surface 16 and the steering condition 66 that allows the user 18 to controllably move the object 12, via one or more wheel assemblies 14, across the surface 16, as shown in the sequence of FIGS. 12-14, 17-18. The application pedal assembly 48 comprises the application pedal 88, application lever 112 and application link 114, as best shown in FIGS. 10 and 49. As shown in these figures, the application pedal 88 is connected to or integral with the generally forward end of the application lever 112. The rearward end of the application lever 112 is connected to the compression application link 80, which interconnects the action arm 54 and tension application link 76. Application link 114 interconnects the forward end of the action arm 54 and the application lever 112.

Figure 2:
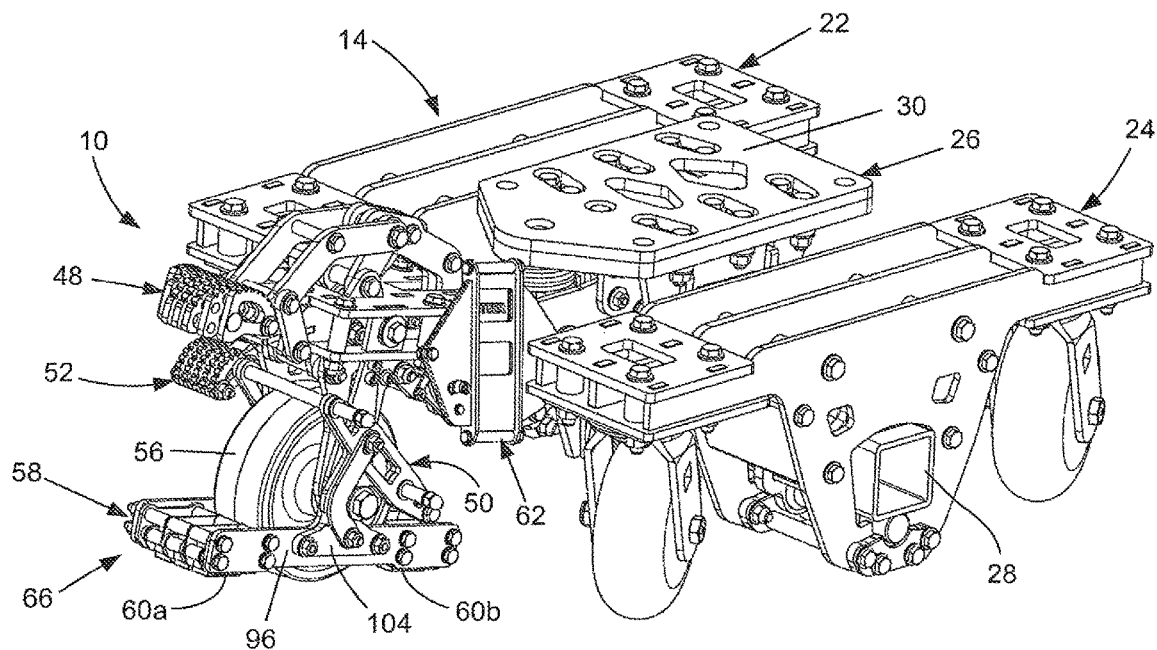
FIG. 2 is a left side perspective view of the braking and steering control apparatus of FIG. 1 shown attached to a wheel assembly, namely, a wheel float having a pedestal to which the apparatus is attached.
Figure 3:
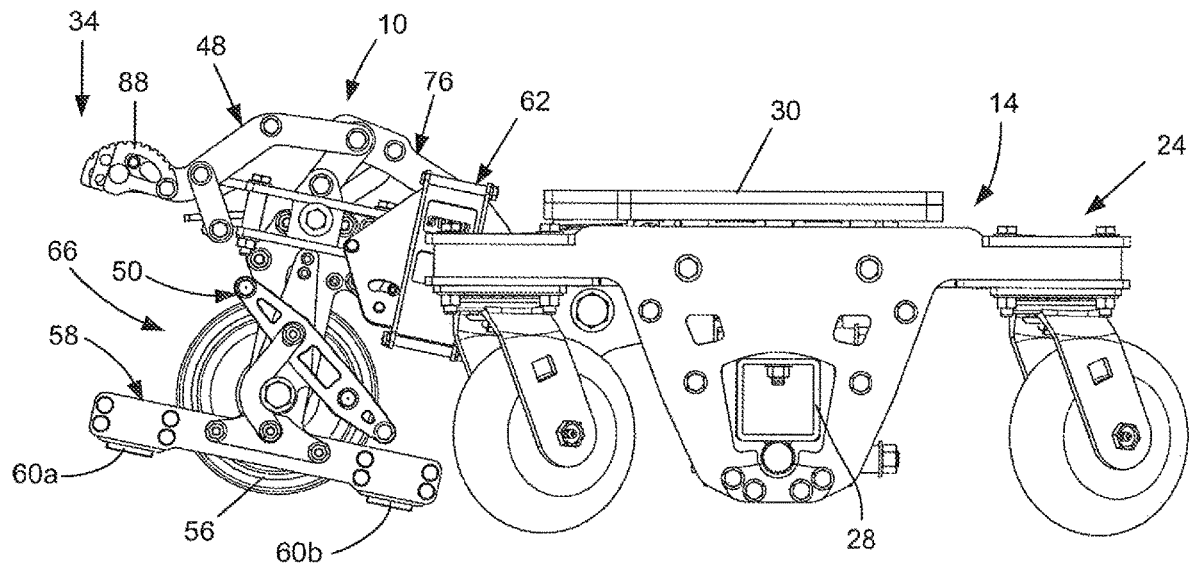
FIG. 3 is a left side view of the braking and steering control apparatus and wheel float of FIG. 2.
Figure 4:
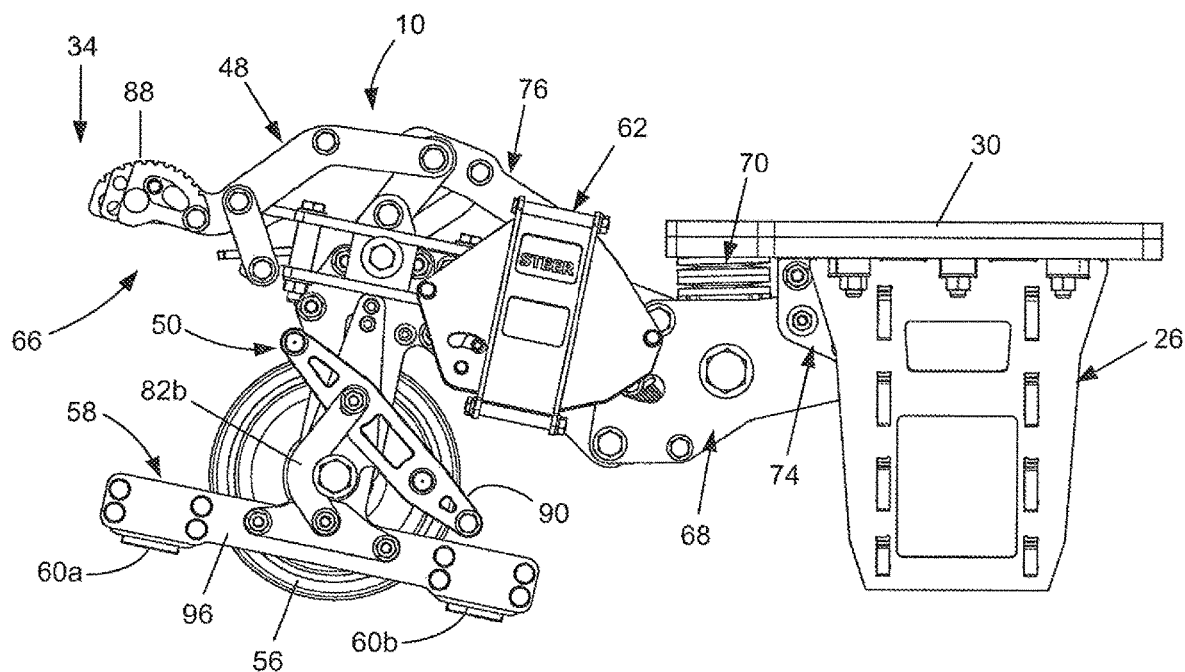
FIG. 4 is a left side view of the braking and steering control apparatus and pedestal of the wheel float of FIG. 3.
Figure 5:
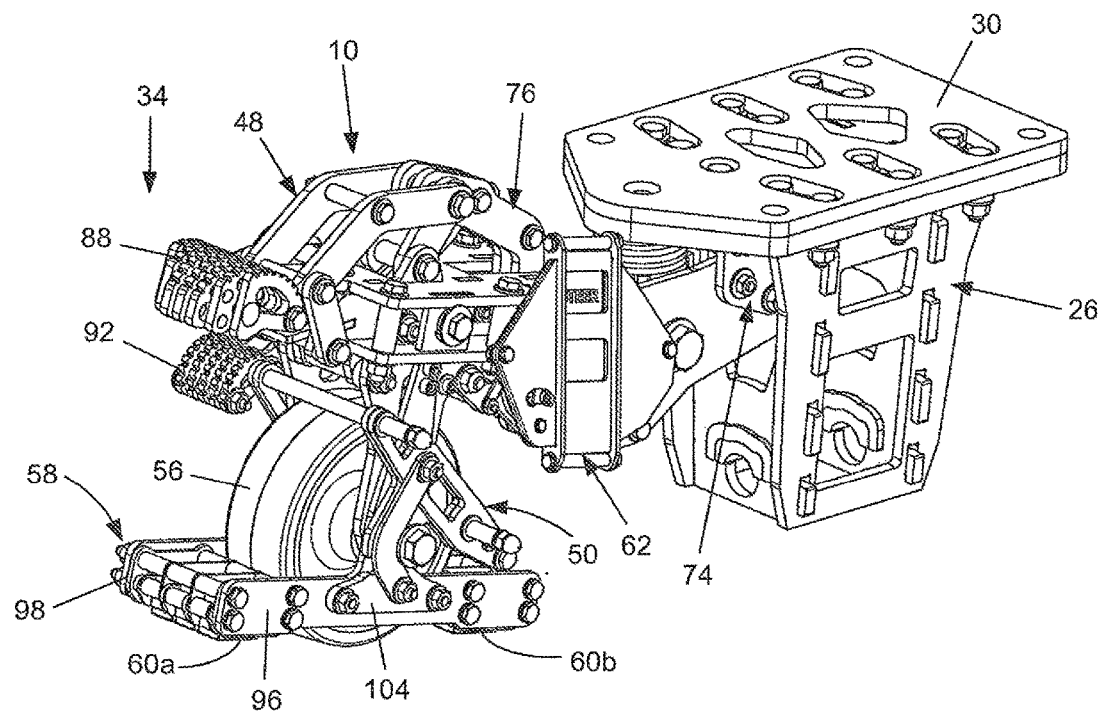
FIG. 5 is a left side perspective view of the braking and steering control apparatus and pedestal of FIG. 4.
Figure 6:
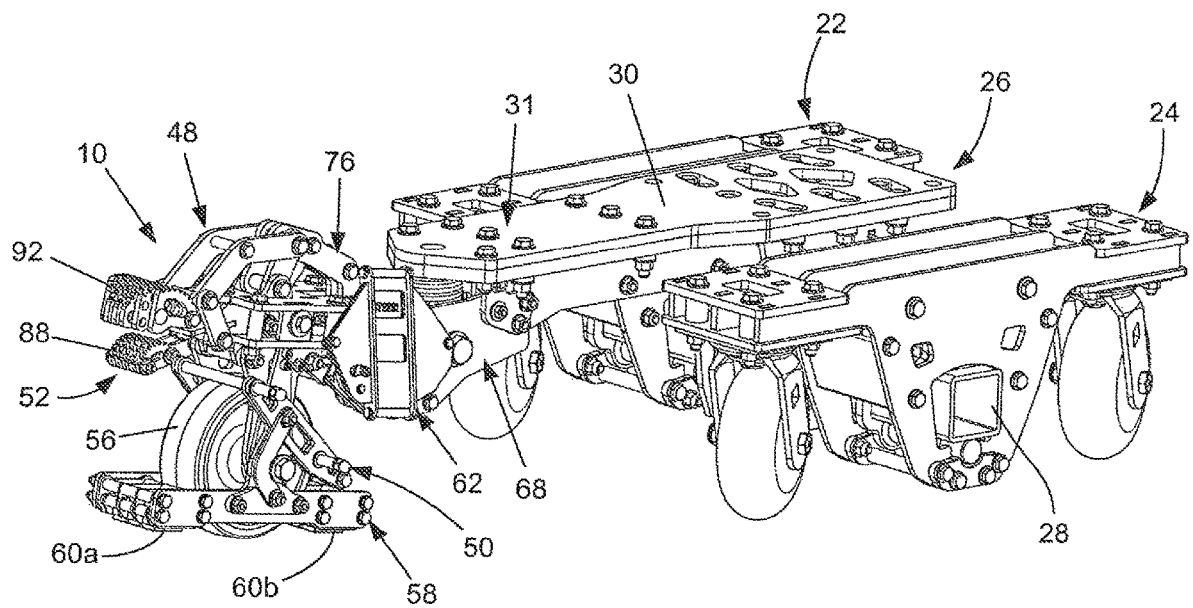
FIG. 6 is a left side perspective view of the braking and steering control apparatus of FIG. 1 shown attached to the wheel float of FIG. 2, which has been modified to include a pedestal with a mounting plate having an outwardly extending section integrally formed therewith to which the apparatus is attached to provide customizable extended length attachment.
Figure 40:
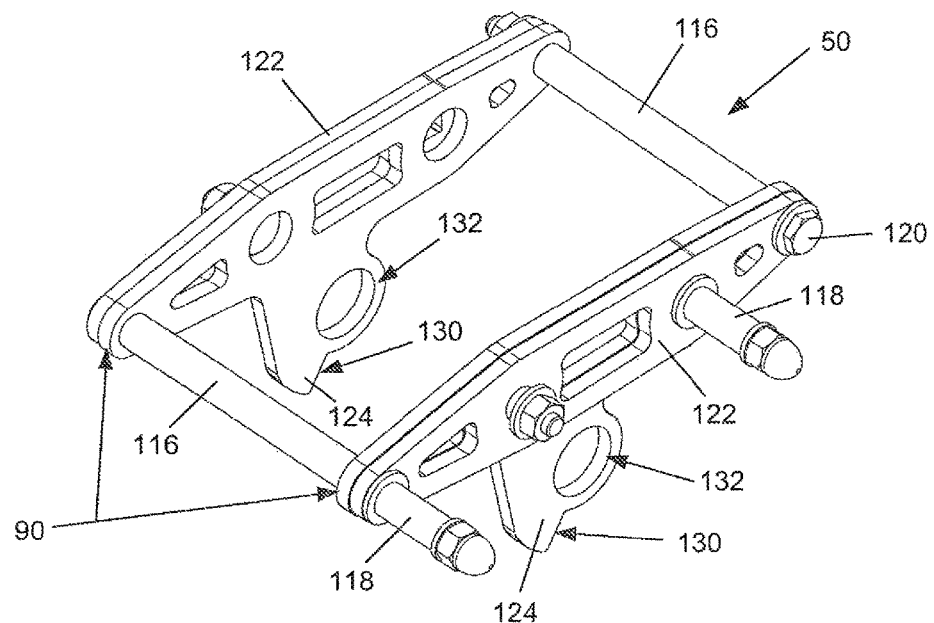
FIG. 40 is a side perspective view of the selector lever assembly of the new braking and steering control apparatus shown in FIG. 10.
Figure 41:
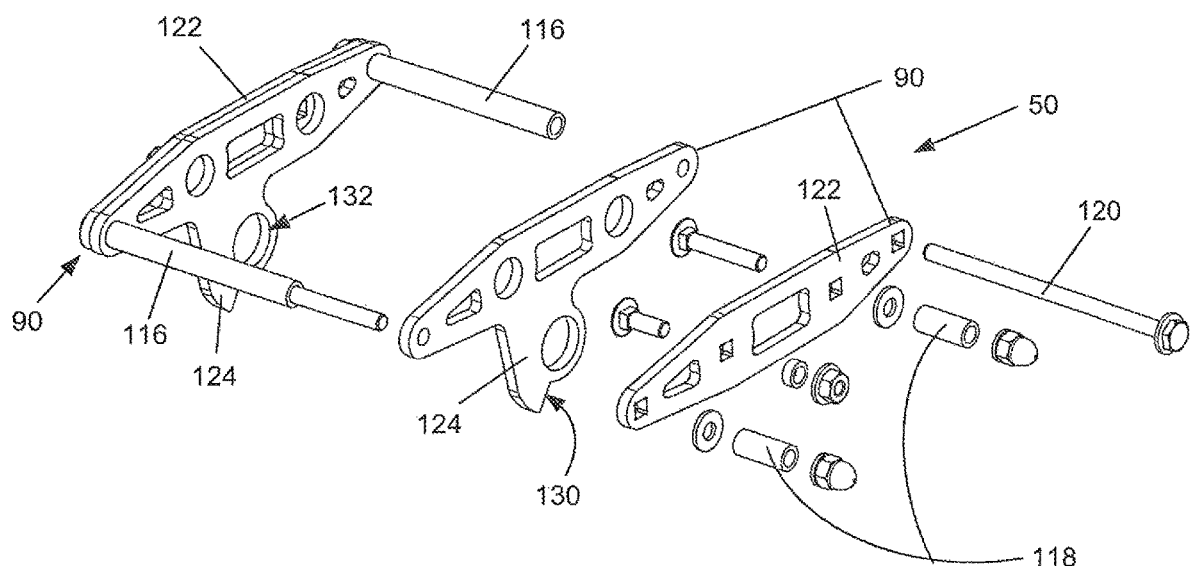
FIG. 41 is an exploded side perspective view of the selector lever assembly of FIG. 40.

The selector lever assembly 50, which is best shown in FIGS. 10 and 40-41, is utilized by the user 18 to place the apparatus 10 in one of its braking condition 64 and its steering condition 66 by using his or her foot 20 to either, respectively, press downward on the selector lever assembly 50 or pull upward on the selector lever assembly 50. The selector level assembly 50 comprises a pair of spaced apart selector levers 90, a pair of spacer tubes 116, a pair of actuator post tubes 118 and a connecting pin 120, as best shown in FIG. 41. As also best shown in FIG. 41, each of the selector levers 90 have a lever doubler 122 to provide extra strength for the selector levers 90. Each of the selector levers 90 have a connecting section 124 with an aperture 132 that allows the selector lever assembly 50 to pivotally connect to the axle spacer tubes 126 (best shown in FIGS. 44-48) associated with the axle 128 on each side of the of the action arm assembly 54, as best shown in the exploded view of the action arm 54 of FIG. 48. The axle 128 rotatably supports the wheel 56. Each connecting section 124 of the selector levers 90 has an outwardly extending pressure face 130 that presses downward on the upper surface of the pressure plate 104 of the brake assembly 58 to direct the brake pads 60 thereof against the surface 16 when the user 18 presses down on the selector lever assembly 50 to place the apparatus 10 in its braking condition 64 to secure the apparatus 10, and therefore the object 12 and wheel assemblies 14, in place on the surface 16. The selector links 82a/82b connect to the bolts shown in FIGS. 40-41 that are associated with the two lever doublers 122. The opposite ends of the selector links 82a/82b connect to the center bolt associated with the pressure plate 104, as best shown FIGS. 11-24. The actuator post tubes 118 that extend outwardly from the of the selector levers 90, as best shown in FIGS. 1-2 and 40, are utilized to limit the free movement of the selector lever assembly 50 when the user 18 utilizes his or her foot 20 to press down or pull up on the selector lever assembly 50.

Figure 42:
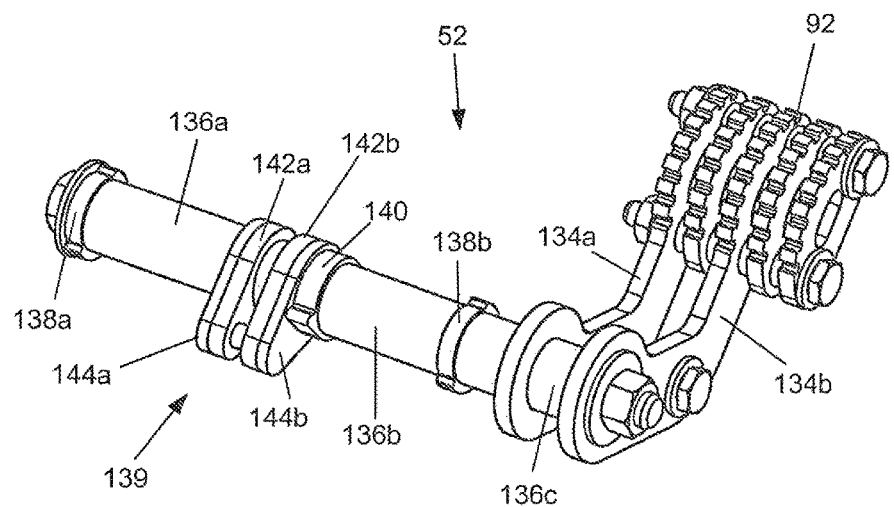
FIG. 42 is side perspective view of the release pedal assembly of the new braking and steering control apparatus shown in FIG. 10.
Figure 43:
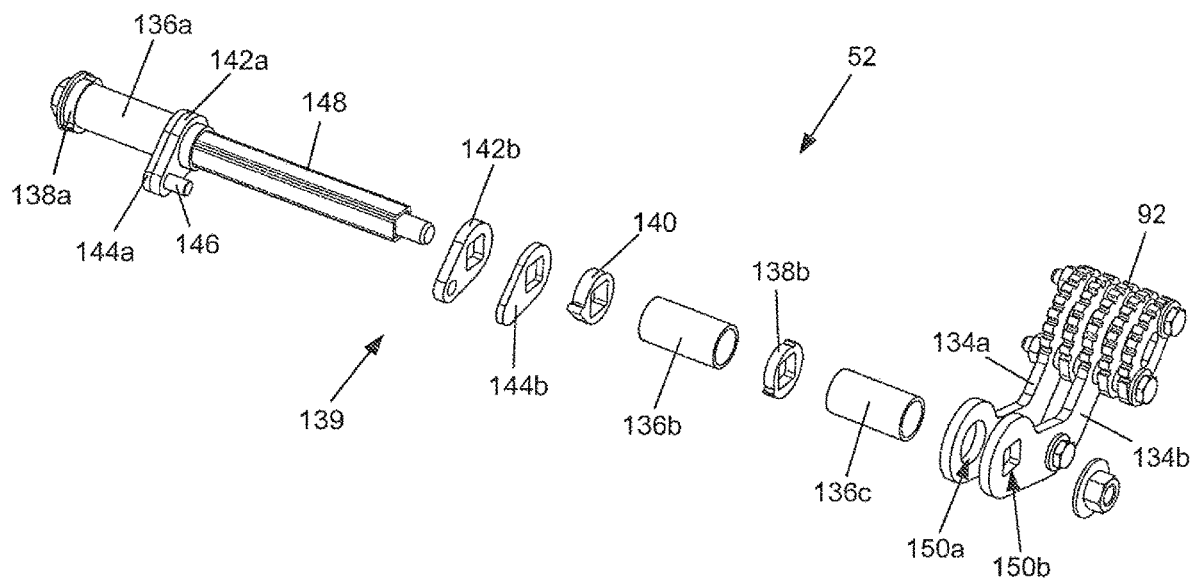
FIG. 43 is an exploded side perspective view of the release pedal assembly of FIG. 42.

The release pedal assembly 52, which is best shown in FIGS. 1-2, 9-10, 19, 21-22, 28, 32, 36 and 42-43, is pressed by the user 18 to disengage, as is relevant, either the braking condition 64 or steering condition 66 of the apparatus 10. Applying pressure to the release pedal 92 disengages the braking condition 64 or steering condition 66 by releasing the pressure applied by the engagement spring 71 (which was pressing downward on the wheel 56 or brake pads 60) to the surface 16 and, with the help of the return spring 73 of the return spring assembly 72 (best shown in FIGS. 10, 25-27, 29-31 and 33-35), the release pedal assembly 48 lifts and locks the brake assembly 58 up off the surface 16. The release pedal assembly 52 comprises the release pedal 92, a pair of lever arms 134a and 134b, a plurality of spacer tubes 136a, 136b and 136c, thrust rings 138a and 138b, cog ring 140, a pair of levers 142a and 142b, a pair of retainers 144a and 144b, a lever pin 146 and a shaped drive tube 148, as best shown in FIGS. 42-43. The release pedal 92 is connected to both of the outwardly extending of the lever arms 134a/134b. As shown in FIG. 43, the inward ends of the lever arms 134a/134b have, respectively, apertures 150a and 150b, both of which are sized and shaped in corresponding relation to the components which they engage and/or connect. In the figures, the aperture 150a of the inside lever arm 134a is round to be positioned over the round space tube 136c and the aperture 150b of the outside lever arm 134b is square to engage the square shaped drive tube 148 such that movement of the release pedal 92 will rotate the drive tube 148 and, therefore, the entire release pedal assembly 52. Except for the release pedal 92, lever arms 134a/134b, spacer tube 136c, and thrust rings 138a/138b, the elongated portion 139 of the release pedal assembly 52 is positioned inside the action arm assembly 54 through the center aperture 152 (shown in FIGS. 44-48) thereof and are held in place in the action arm 54 by the thrust rings 138a/138b. The lever pin 146, which is positioned between the levers 142a/142b, is sized and configured to be received inside the slot 154 at the forward end of the tension application link 76 (which slot 154 also receives upper end of the compression application link 80, which are best shown in FIGS. 10 and 43) in a manner which allows the lever pin 146 to slip back and forth in the slot 154 in order to move the tension application link 76 in response to movement of the release pedal assembly 52.

The action arm assembly 54 is effectively the "center" of the new apparatus 10, interconnecting the user accessible and operable components of the control group 46 (namely, the application pedal assembly 48, selector lever assembly 50 and release pedal assembly 52), the surface contact/release components (e.g., the wheel 56, brake assembly 58, engagement spring assembly 70 and return spring assembly 72), the selection position indicator 62 and the components that connect the apparatus 10 to an object 12 or wheel assembly 14, as best shown in FIG. 10. The action arm assembly 54 comprises an upper main plate 156, a lower main plate 158, a pair of rib plates 160a/160b, a pair of connector plates 162 (only one shown), a pair of leg plates 164a/164b, a plurality of vertically disposed spacer tubes 166, a pair of bronze bearings 168a/168b, a guide plate 170 and a plurality of spacer rings 172, as best shown in FIGS. 44-48. A plurality of connecting elements, such as bolts or screws, connect the upper main plate 156 and the lower main plate 158 with the spacer tubes 166 between the two main plates 156/158 to receive the connecting elements therethrough and hold the main plates 156/158 in spaced apart relation to each other. Using slots in the main plates 156/158, the rib plates 160a/160b are positioned toward the center of the main plates 156/158, though in spaced apart relation to each other, generally toward the opposite sides (left/right) of and secured between the two main plates 156/158 with a horizontally disposed spacer tube 174 and the guide plate 170 secured between the two rib plates 160a/160b. The guide plate 170 extends out beyond the forward end of the main plates 156/158 to maintain the alignment of the application pedal assembly 48 against unintended lateral forces.

Figure 44:
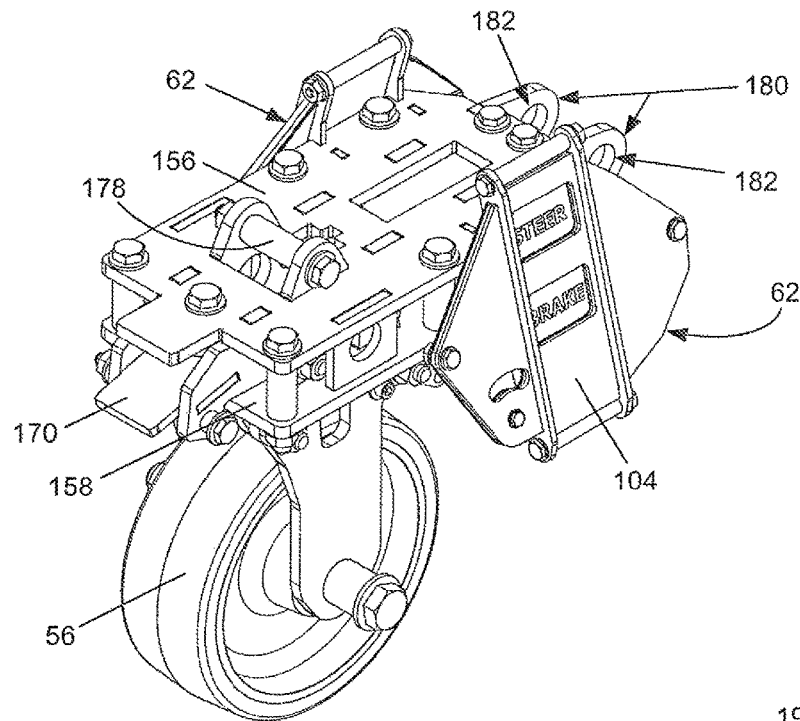
FIG. 44 is a side perspective view of the action arm assembly of the new braking and steering control apparatus shown in FIG. 10, with the action arm assembly having the selection position indicator attached thereto.
Figure 45:
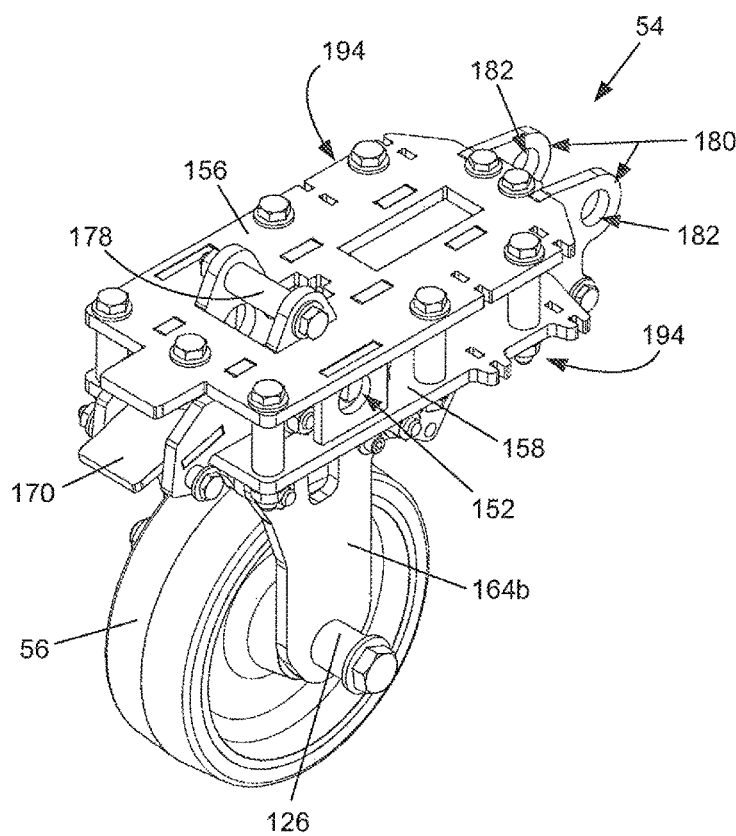
FIG. 45 is a side perspective view of the action arm assembly of FIG. 44 shown without the selection position indicator.
Figure 46:
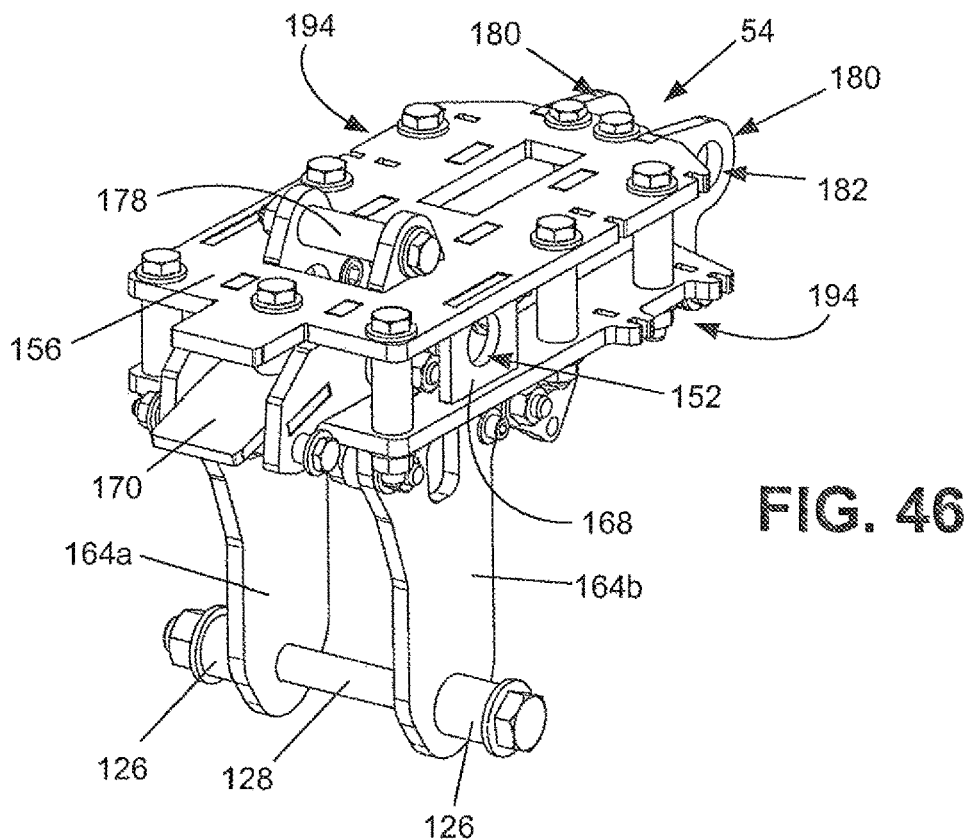
FIG. 46 is a side perspective view of the action arm assembly of FIG. shown without the wheel.

Outside of each rib plate 160a/160b and connected thereto is positioned a connector plate 162. Outside and connected to each connector plate 162 is a leg plate 164a/164b, with the upper portion thereof being sized and shaped to extend upward through slots in the lower main plate 158. Spacer rings 172 are utilized between the leg plates 164a/164b and the respective rib plates 160a/160b to "balance" the thickness of the connector plate 162. The leg plates 164a/164b extend downward below the lower main plate 158 to provide the support and connection for the axle spacer tubes 126a/126b and the axle 128, which rotatably supports the wheel 56. Outside the leg plates 164a/164b, close to the outside edge of the main plates 156/158, are located the bronze bearings 168a/168b that each define a center aperture 152 through which is received the elongated portion 139 of the release pedal assembly 52 (as described above). Each of the rib plates 160a/160b have an upward extending section 176 that supports an upper spacer tube 178 that is positioned above the top surface of the upper main plate 156, as best shown in FIGS. 44-46. The upper main plate 156 and the lower main plate 158 define a mounting area 194 (having slots and cut-out sections, as best shown in FIGS. 39 and 45-48) that is configured in corresponding relation to the mounting tabs 196 (best shown in FIG. 39) on the selection indicator 110 of the selection position indicator 62 for mounting the selection position indicator 62 on each of the sides of the action arm assembly 54.

Figure 47:
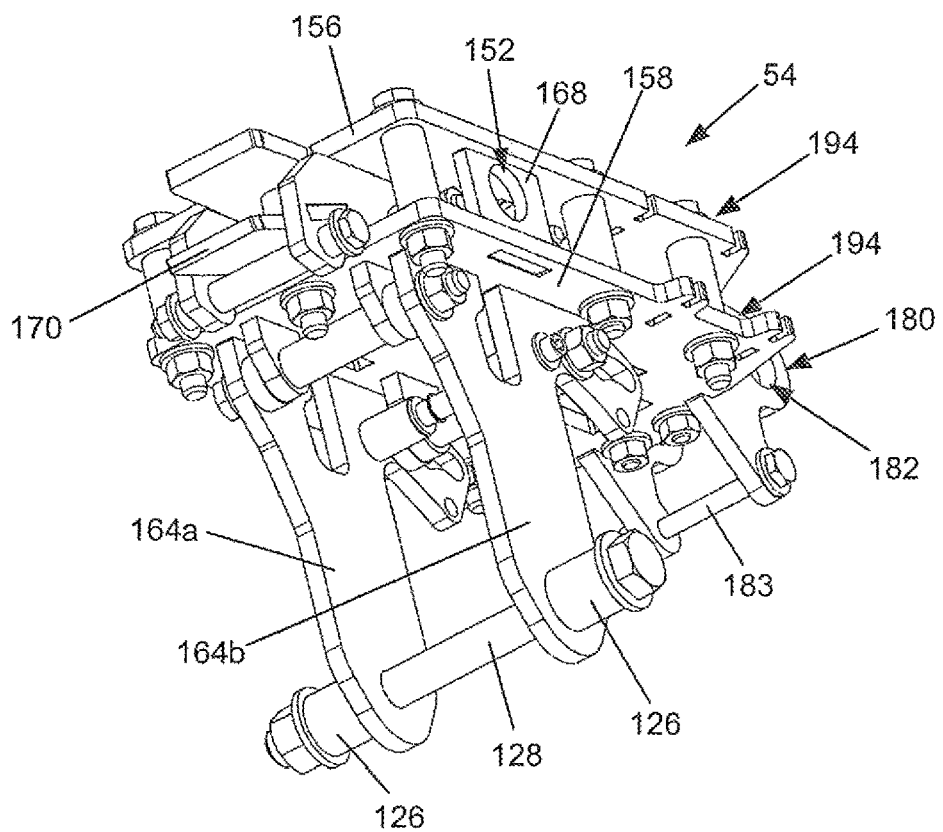
FIG. 47 is a bottom perspective view of the action arm assembly of FIG. 46.
Figure 48:
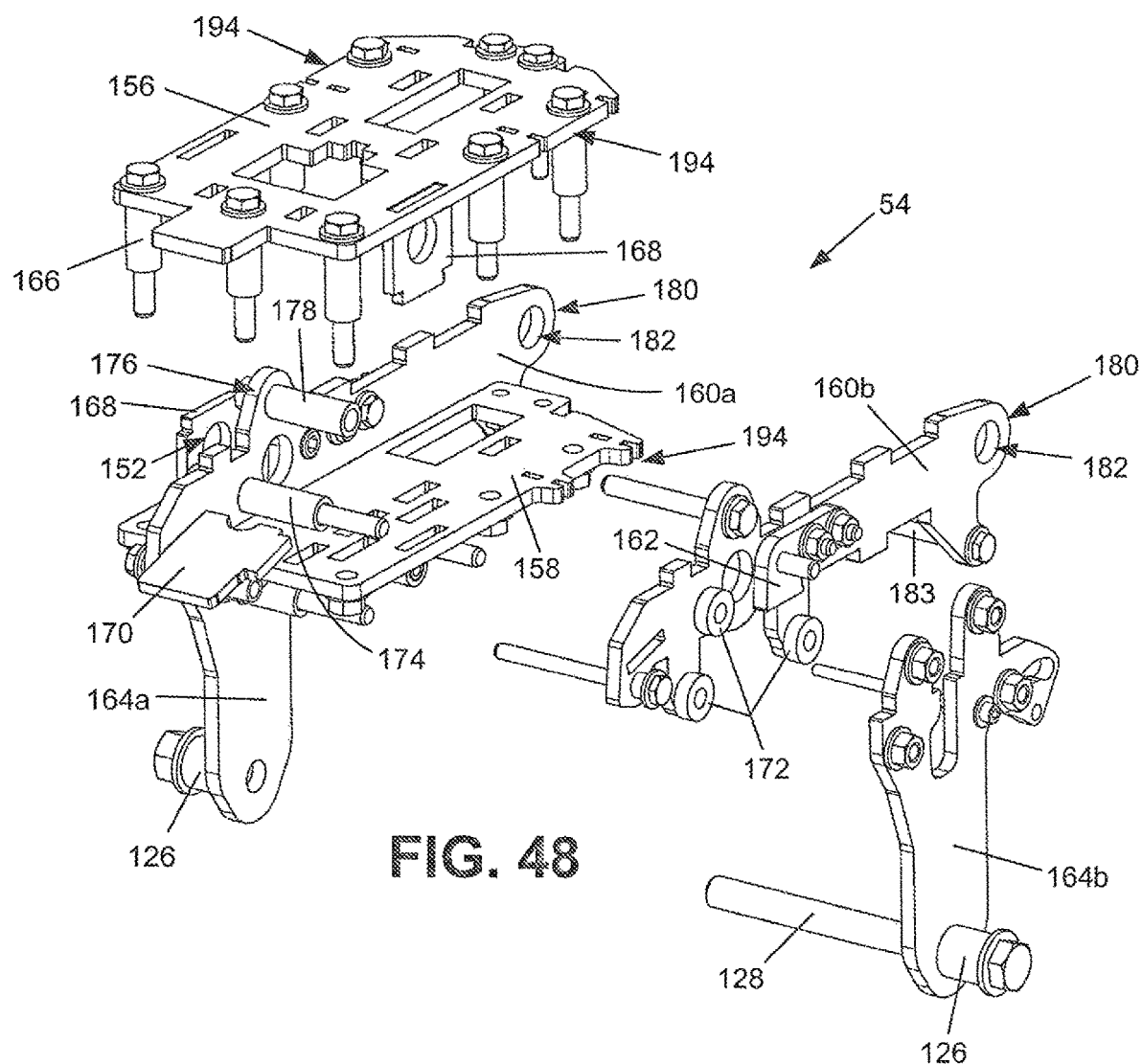
FIG. 48 is an exploded side perspective view of the action arm assembly of FIG. 46.

The lower/rearward end of the compression application link 80 pivotally interconnects both the application pedal assembly 48 and the tension application link 76 with the upper spacer tube 178 to facilitate the transfer of motion from the application pedal assembly 48 to the reaction arm 68, the engagement spring assembly 70 and the return spring assembly 72, as best shown in FIG. 10. Each of the rib plates 160a/160b have a rearwardly extending section 180 with a connecting aperture 182 that allows a pivotal connection with the spacer tube and bolt at the upper forward end of the reaction arm 68 so the reaction arm 68 can pivot in response the motion of the application pedal assembly 48, via the tension application link 76. The connecting section 180 also has an elongated spring assembly connector 183, which is best shown in FIG. 47, that supports the lower end of the return spring assembly 72, the upper end of which is supported by a connector through the lower end of the reaction arm 68 rearward of where the tension application link 76 connects. The opposite, rearward end of the reaction arm 68 connects to the connecting assembly 74, which is utilized to connect to a wheel assembly 14 or to the object 12, typically via an object connecting assembly 32 (which comprises a connecting plate 184 supported by a base plate 186, as shown in FIGS. 4-18 and 24-35). As set forth above, the connecting plate 184 can connect directly to the object 12 or to a frame or other component that connects to the object 12 to assist with the movement thereof.

Figure 14:
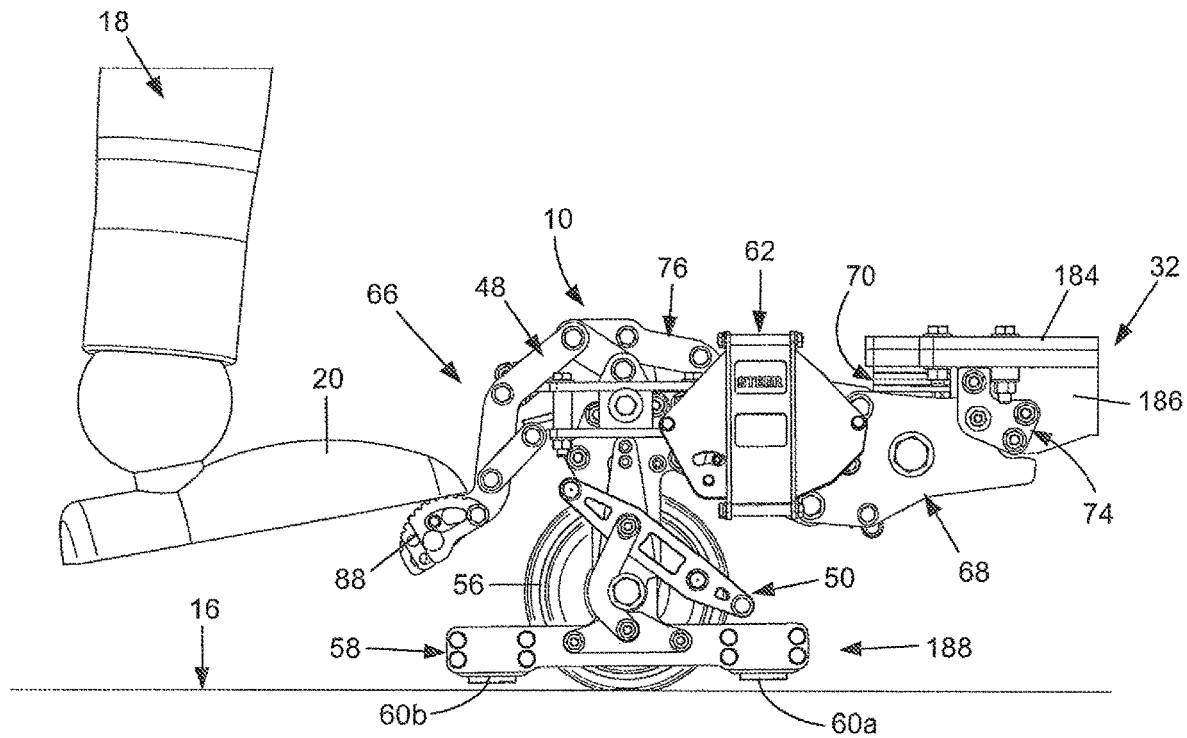
FIG. 14 is a left side view of the braking and steering apparatus of FIG. 13 showing the user's foot further pressing down on the application pedal of the apparatus to press the wheel thereof downward against the surface and lock the apparatus in its steering condition.

As set forth in more detail below, the transition from the braking condition 64 to the steering condition 66 or from the steering condition 66 to the braking condition 64 is achieved by the user 18 first pressing downward on the application pedal 88 of the application pedal assembly 48, as shown in FIG. 14, to release the apparatus 10 from whichever condition 64/66 it is in so he or she can then move the apparatus 10 to the other braking/steering condition 64/66. Once the existing operating condition 64/66 is released, the user 18 pivots the selector lever 90 of the selector lever assembly 50 by pushing down on or lifting up the selector lever 90 with his or her foot 20. The progressive application of the control group 46 to place the new apparatus 10 in its steering condition 66 is shown in FIGS. 12-18. As the user presses down on the application pedal 88, the soft wheel tread of the wheel 56 makes first contact with the floor or other surface 16. As the user 18 continues pushing the application pedal 88 downward, the tread of the wheel 56 then compresses, as does the engagement spring 71. The application pedal assembly 48 locks down as the application pedal 88 bottoms out, with the brake assembly 58 in its fully released position 188 (as best shown in FIGS. 13-14 and 23-27).

Figure 15:
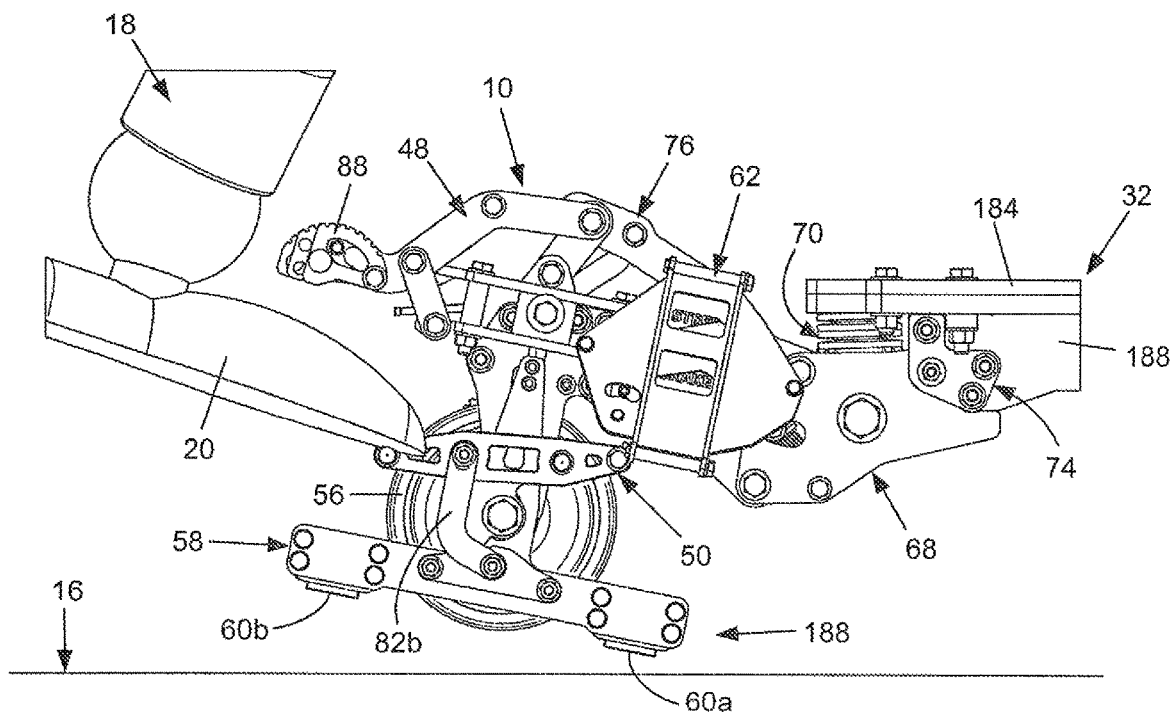
FIG. 15 is a left side view of the braking and steering apparatus of FIG. 14 with the user's foot pressing down on the selector lever of the apparatus to raise the wheel of the apparatus off of the surface and move the selection position indicator to the brake designation to begin the process of placing the apparatus in its braking condition.
Figure 16:
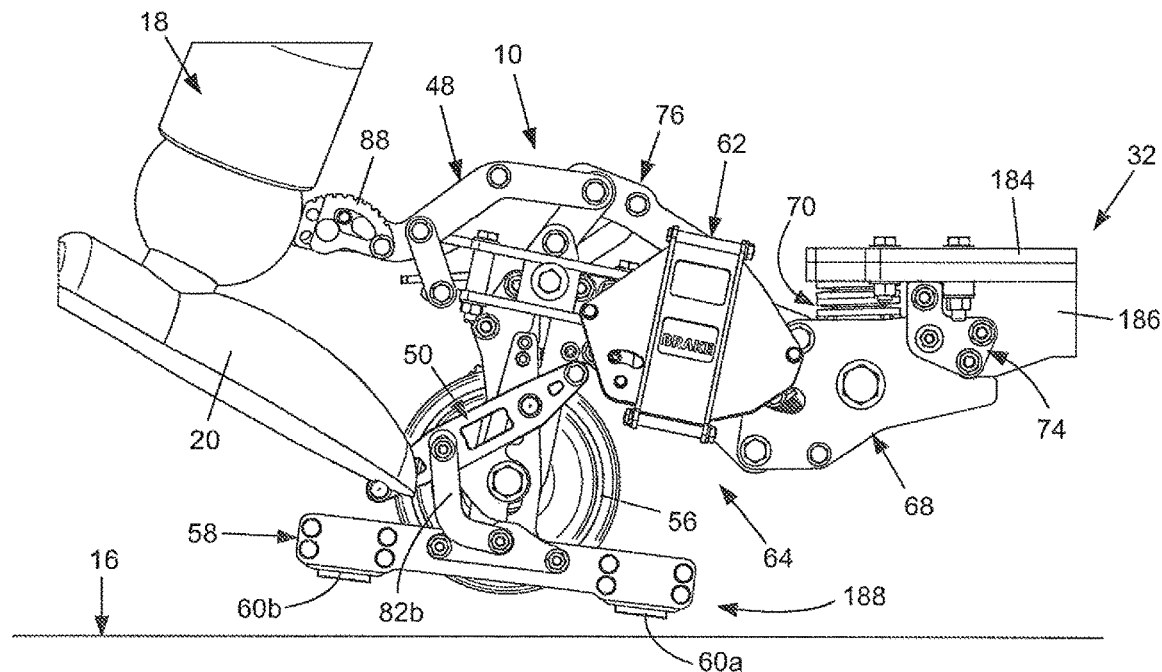
FIG. 16 is a left side view of the braking and steering apparatus of FIG. 15 with the user's foot further pressing down on the selector lever to allow the brake assembly to drop towards the surface.
Figure 17:
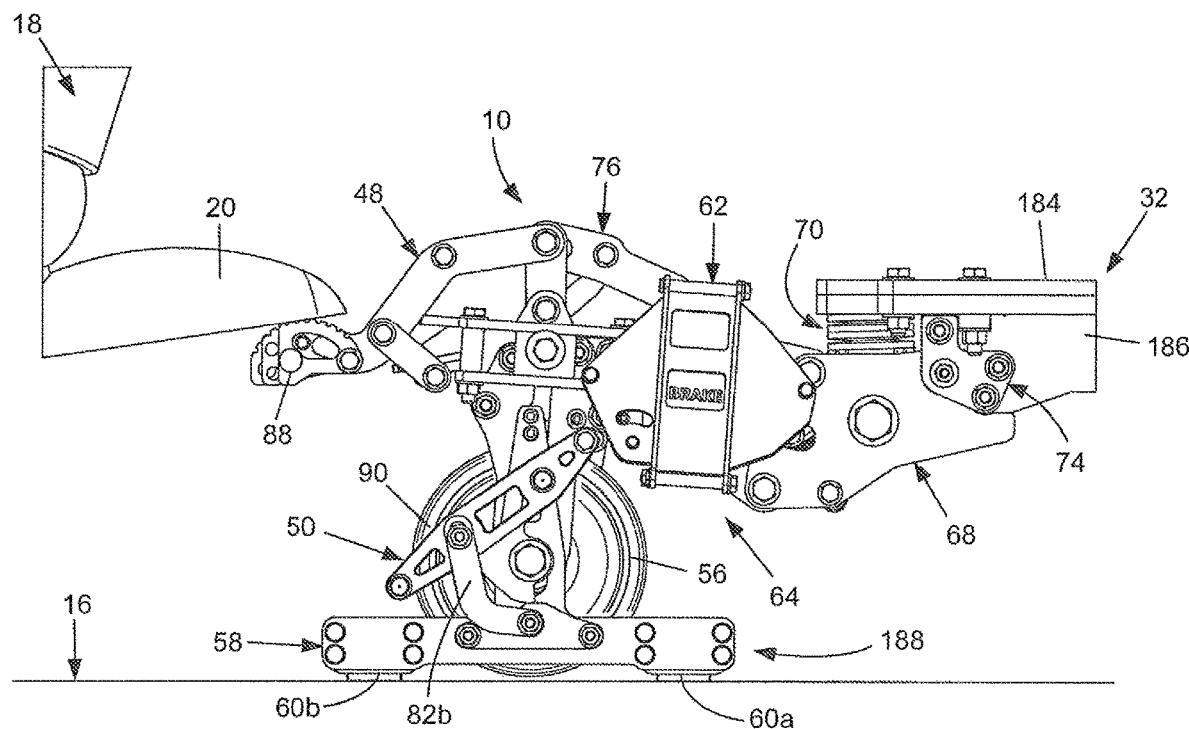
FIG. 17 is a left side view of the braking and steering apparatus of FIG. 16 with the user's foot pressing down on the application pedal to place and level the brake pads of the brake assembly against the surface.
Figure 18:
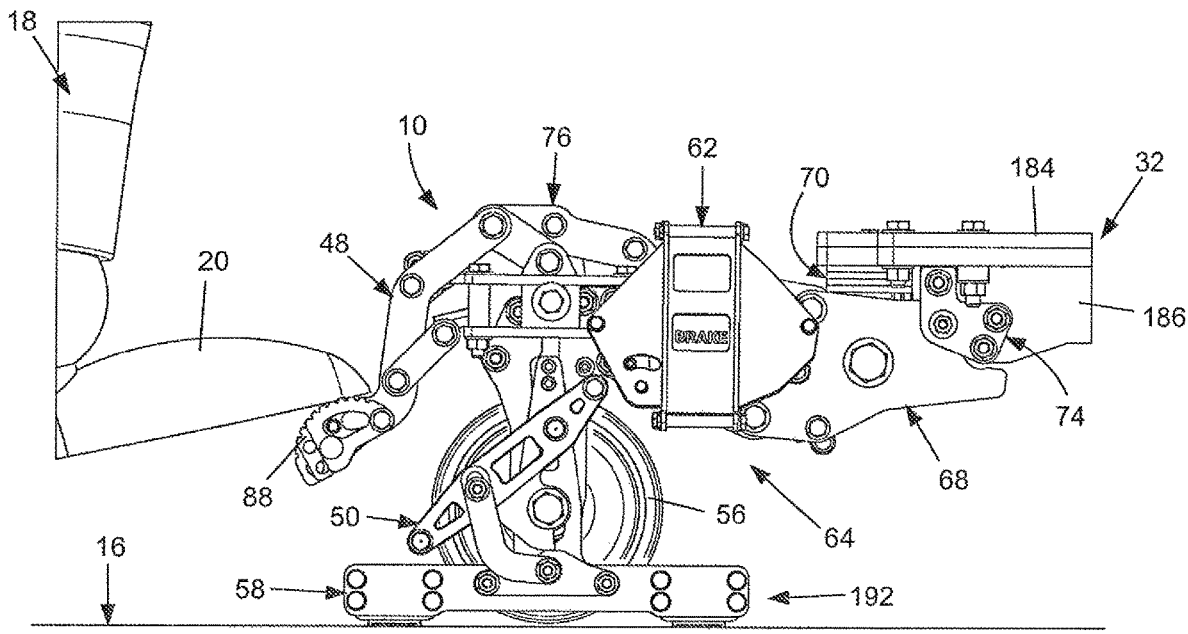
FIG. 18 is a left side view of the braking and steering apparatus of FIG. 17 with the user's foot further pressing down on the application pedal to tightly press the brake pads of the brake assembly against the surface and lock the apparatus in its fully locked condition.
Figure 19:
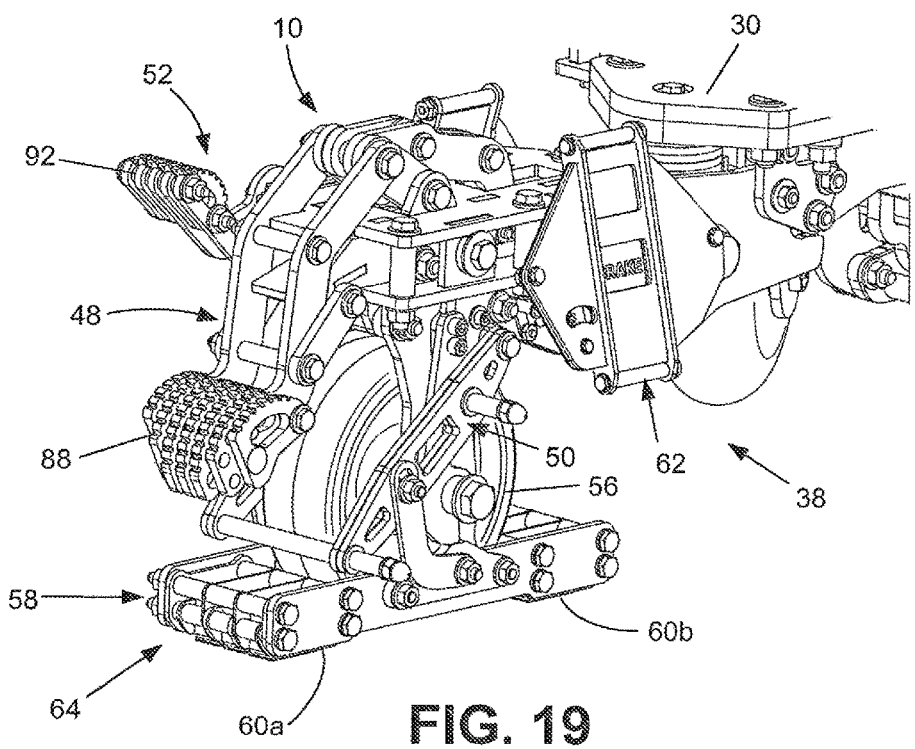
FIG. 19 is a left side perspective view of the braking and steering apparatus of FIG. 1 with the apparatus in its fully locked condition.
Figure 20:
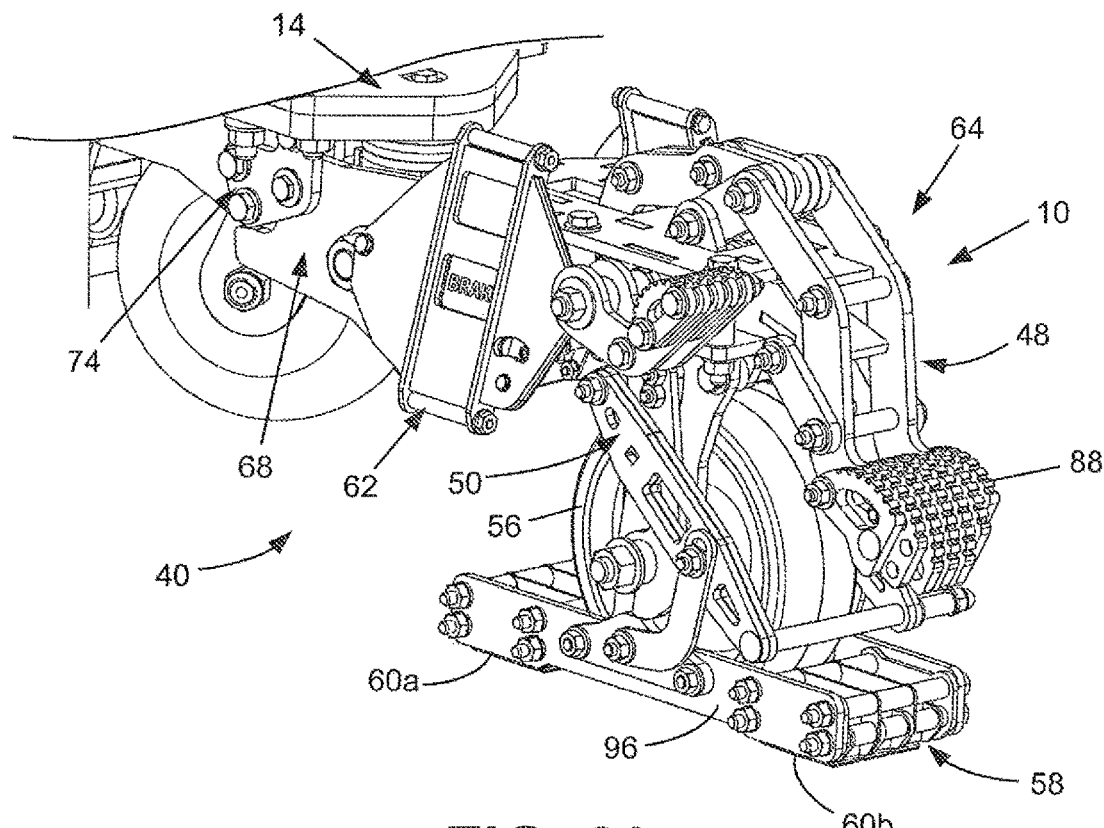
FIG. 20 is a right side perspective view of the braking and steering apparatus of FIG. 19.
Figure 21:
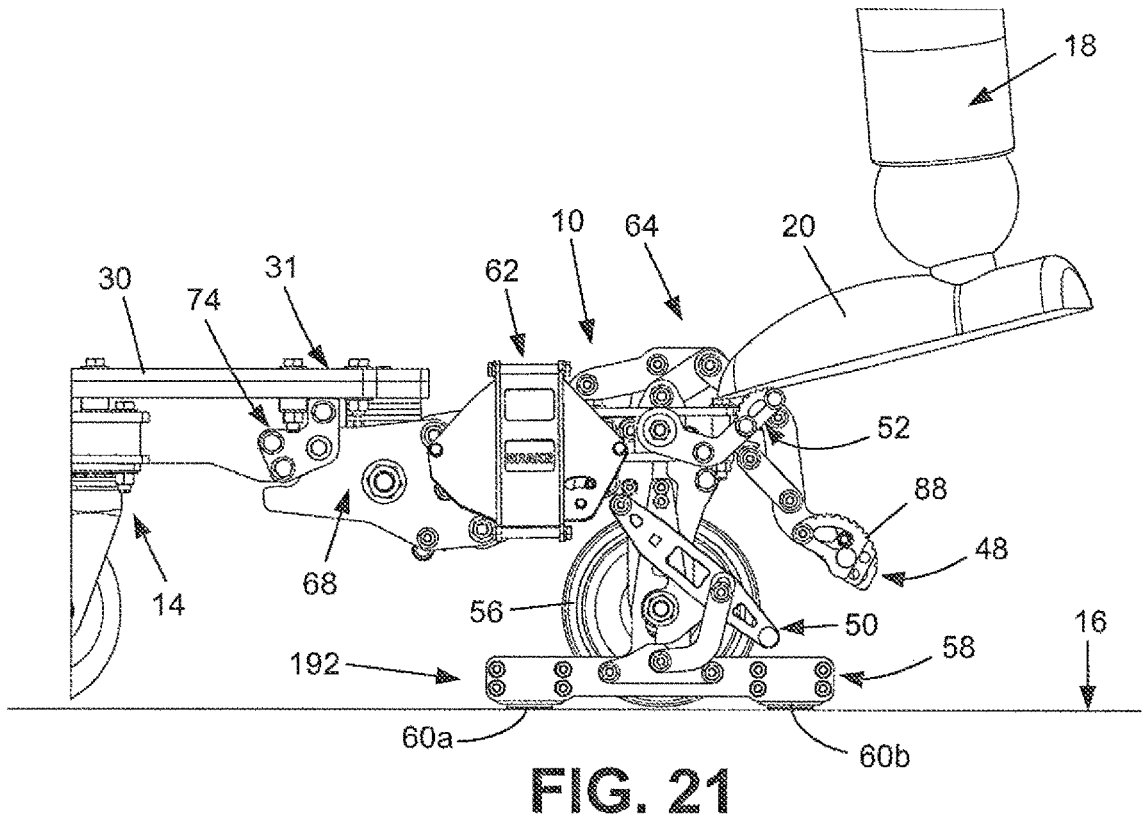
FIG. 21 is a right side view of the braking and steering apparatus of FIG. 20 showing the user's foot pressing down on the release pedal assembly to disengage the brake assembly and release the apparatus from its fully locked condition.
Figure 22:
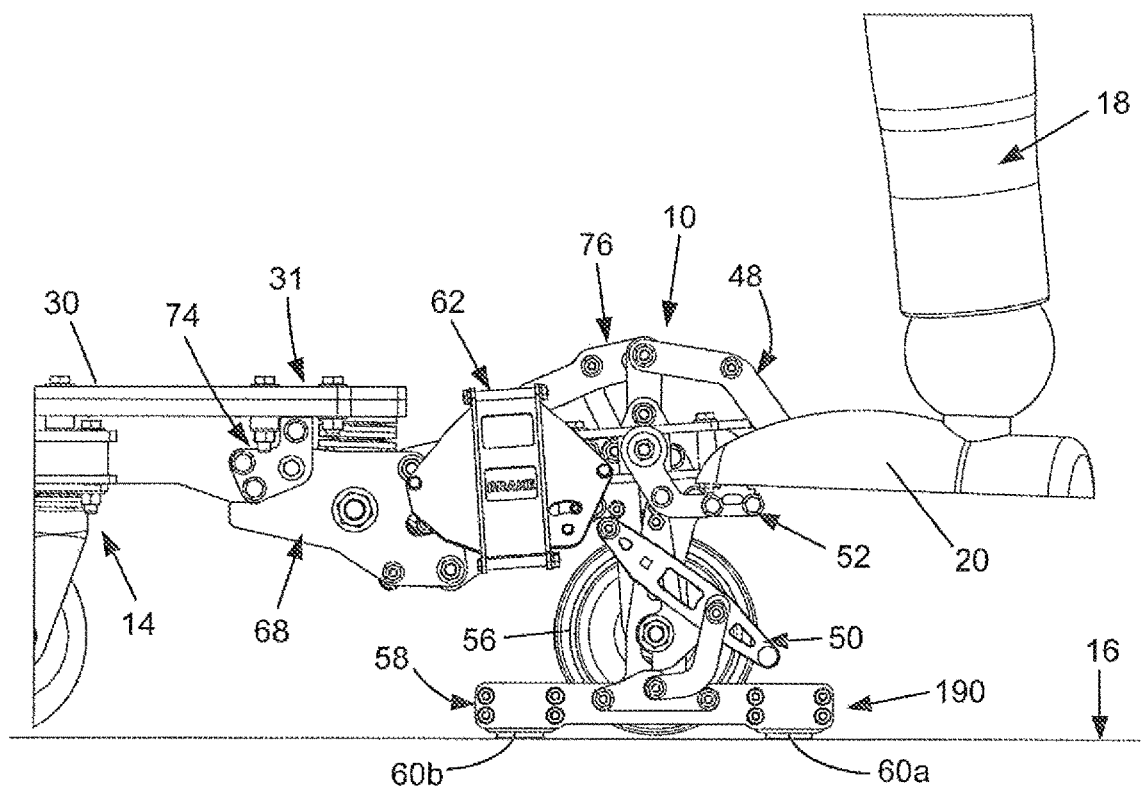
FIG. 22 is a right side view of the braking and steering apparatus of FIG. 21 showing the user's foot further pressing down on the release pedal assembly to release the compression of the application spring assembly to release pressure of the brake pads against the surface to place the brake assembly in its down but not locked condition.
Figure 23:
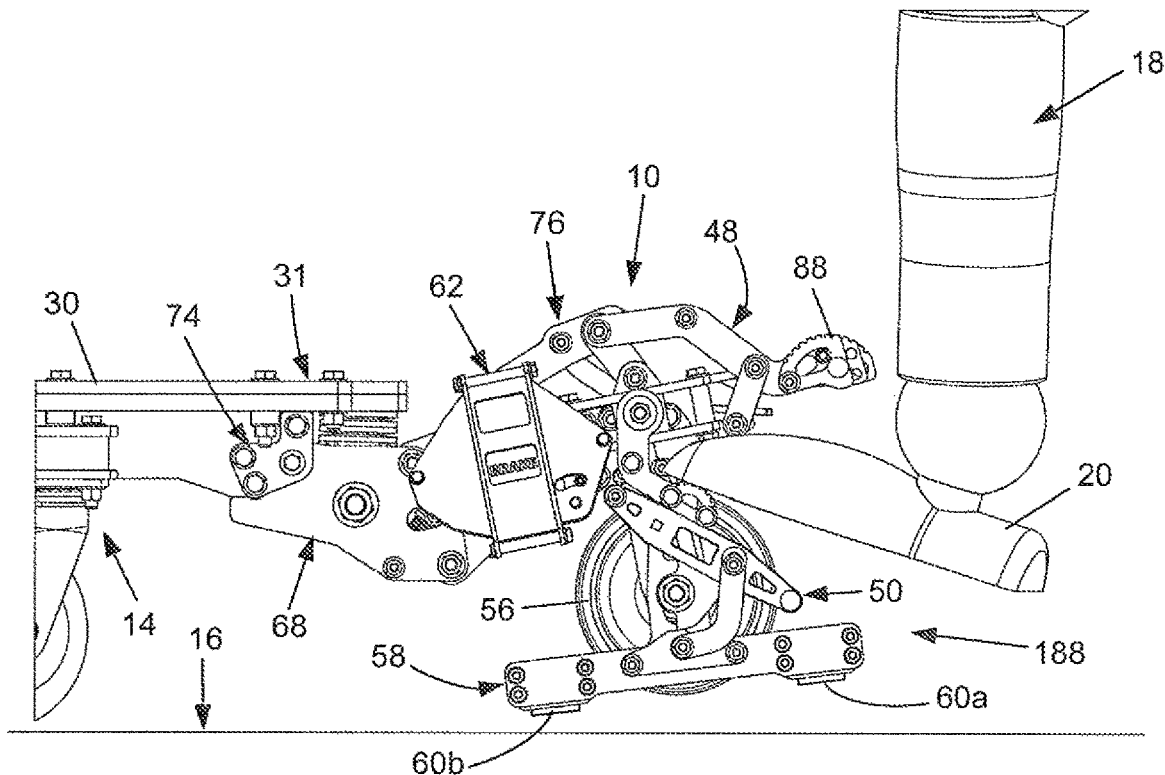
FIG. 23 is a right side view of the braking and steering apparatus of FIG. 22 showing the user's foot further pressing down on the release pedal assembly to allow the return spring assembly lift and lock the brake assembly off of the surface in its fully released position.
Figure 24:
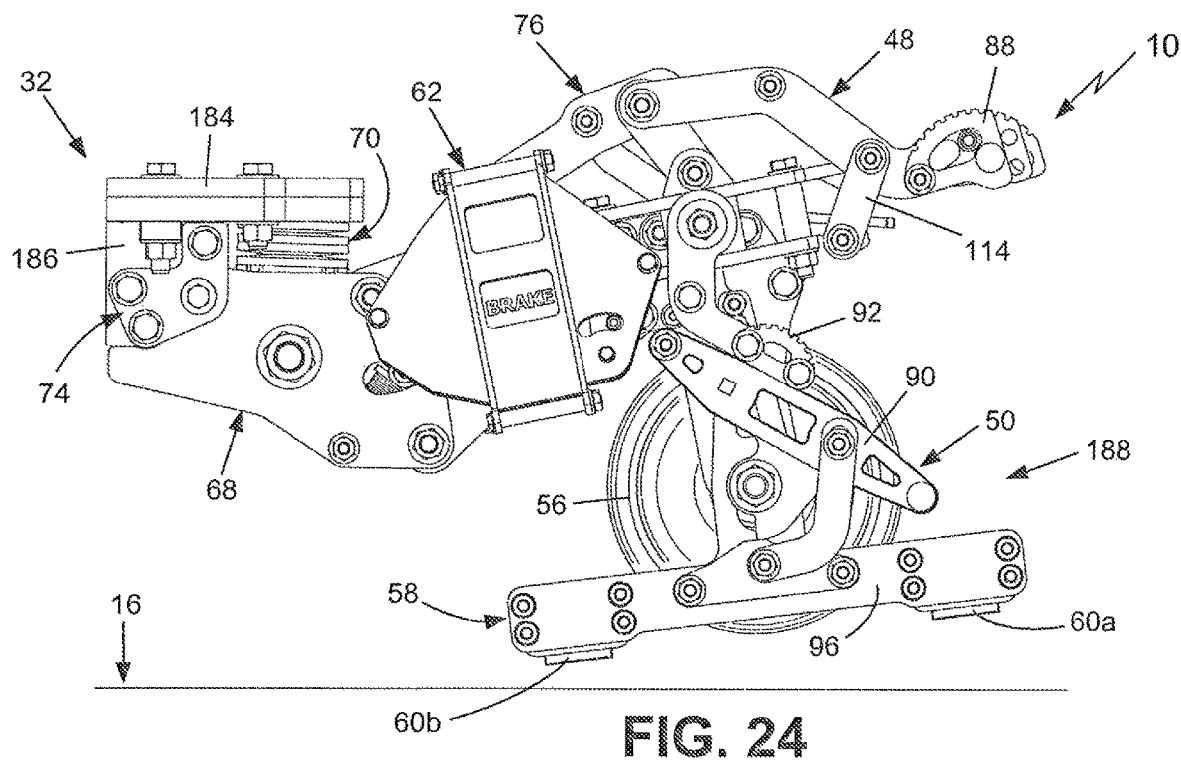
FIG. 24 is a right side view of the braking and steering apparatus of FIG. 23 shown without the user's foot.
Figure 25:
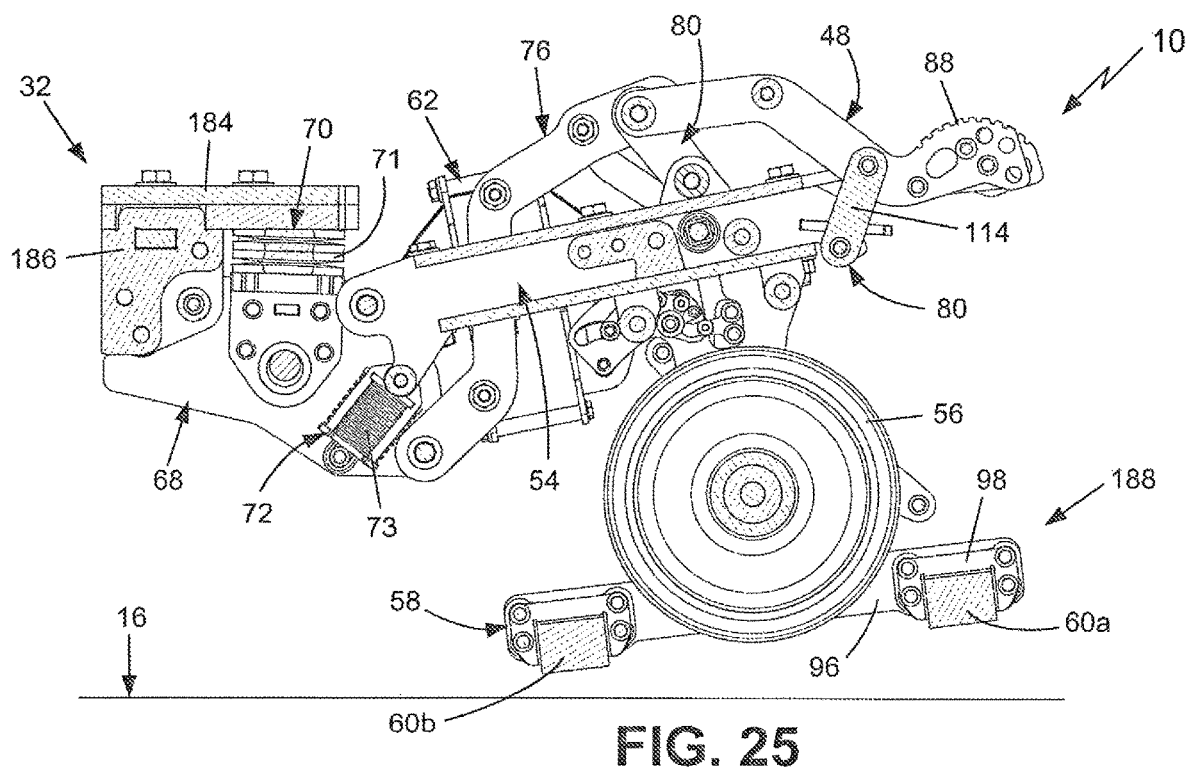
FIG. 25 is a right side view of the braking and steering apparatus of FIG. 24 showing a cross-sectional layer toward the reader cut out of the apparatus.

To select the braking condition 64 instead of the steering condition 66, the user 18 uses his or her foot 20 to flip over the selector lever 90 of the selector lever assembly 50, as shown in FIG. 15, which lowers the brake beam 96 of the brake assembly 58 and flips the indicator shutter 108 of the selection position indicator 62 to "Brake". Flipping the selector lever 90 locks the brake beam 96 into the ready position and the selection position indicator 62 confirms selection of the braking condition 64. In FIGS. 15-16, the user 18 is pushing down on the selector lever 90 to move the apparatus 10 from its steering condition 66 to its braking condition 64. Once the user fully presses down on the selector lever 90, the selector lever 90 locks the brake beam 96 in its ready position, with the selection position indicator 62 in the braking condition 64. The user 18 then presses downward on the application pedal 88 of the application pedal assembly 48, as shown in FIGS. 17-18, to engage the braking operations of the new apparatus 10 in order to stop the movement of the object 12 across the surface 16 and, upon full engagement, secure the object 12 in place on the surface 16. More specifically, when the user 18 presses down again on the application pedal 88, the apparatus levels the twin brake pads 60*a*/60*b* and positions them against the surface 16 to place the brake assembly 58 into its down but not locked position 190 (as shown in FIGS. 17, 22 and 28-31). As the user 18 continues applying pressure to the application pedal 88, the application pedal assembly 48 fully compresses the brake pads 60*a*/60*b* against the surface 16 to place the brake assembly into its into the fully locked position (FIGS. 18, 21 and 32-35).

Figure 26:
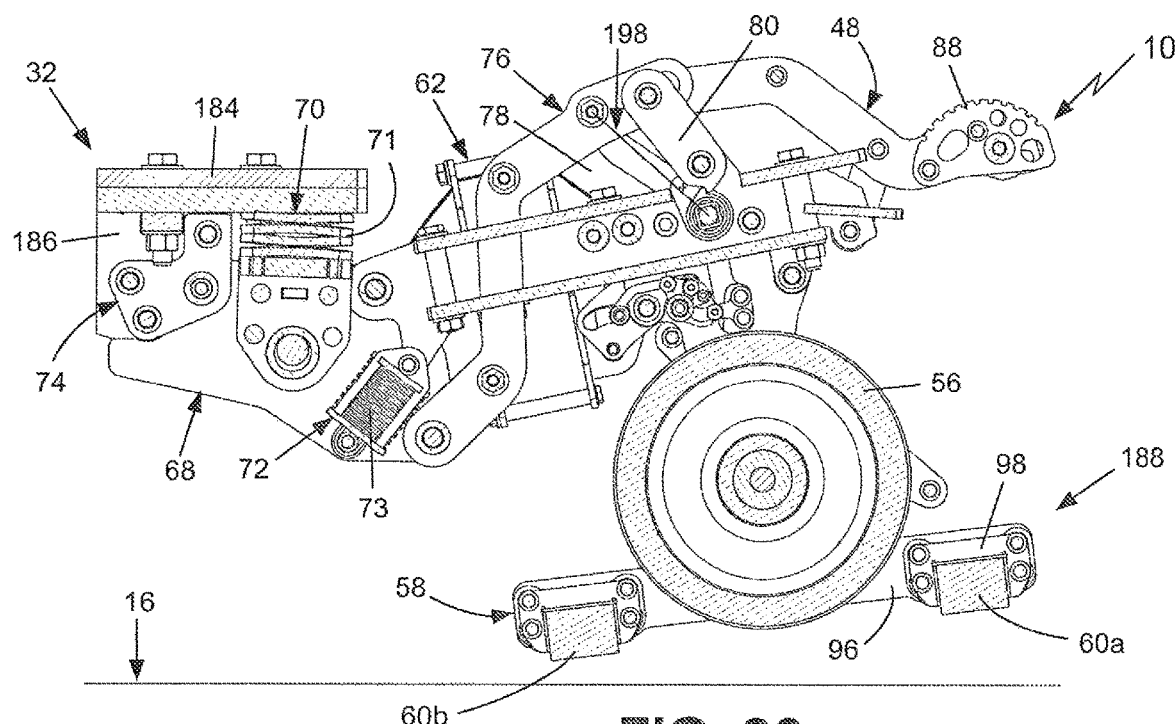
FIG. 26 is a right side view of the braking and steering apparatus of FIG. 25 showing a deeper cross-sectional layer cut out of the apparatus with a line added to show the over-center orientation of the release linkage that holds the action arm to keep the brake assembly in its fully released position.
Figure 27:
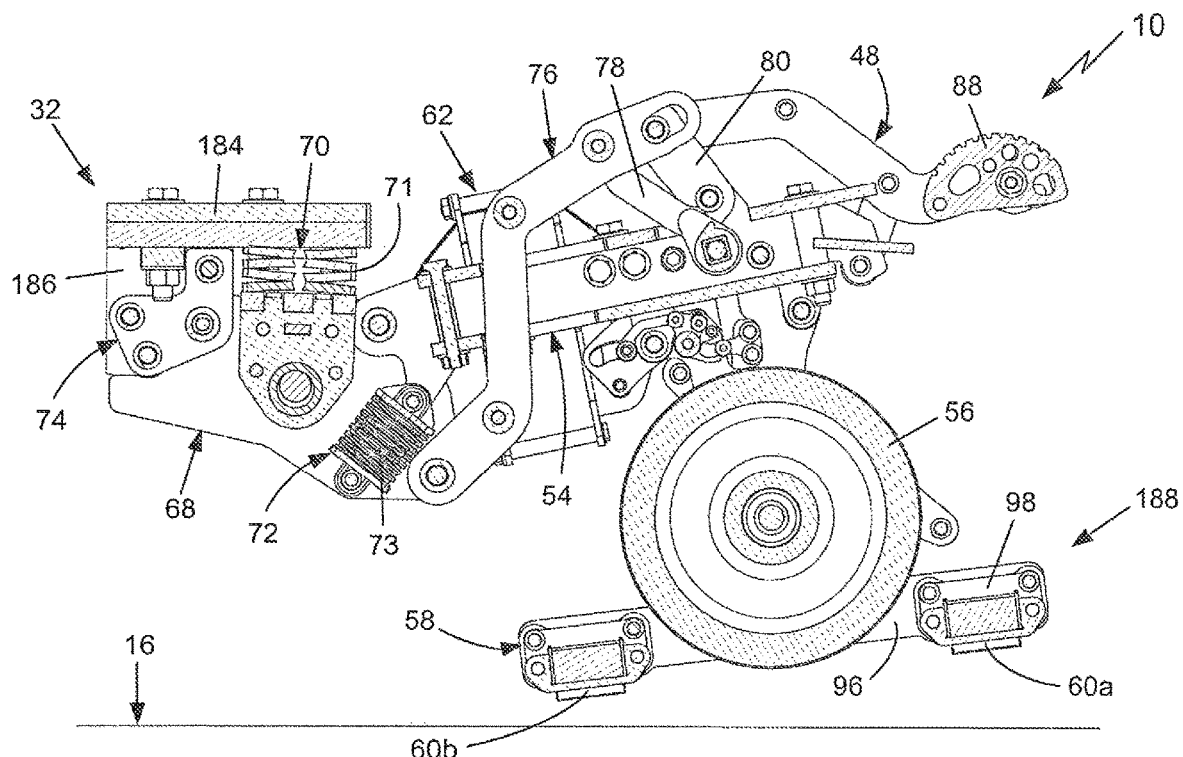
FIG. 27 is a right side view of the braking and steering apparatus of FIG. 26 showing a deeper cross-sectional layer cut out of the apparatus.
Figure 28:
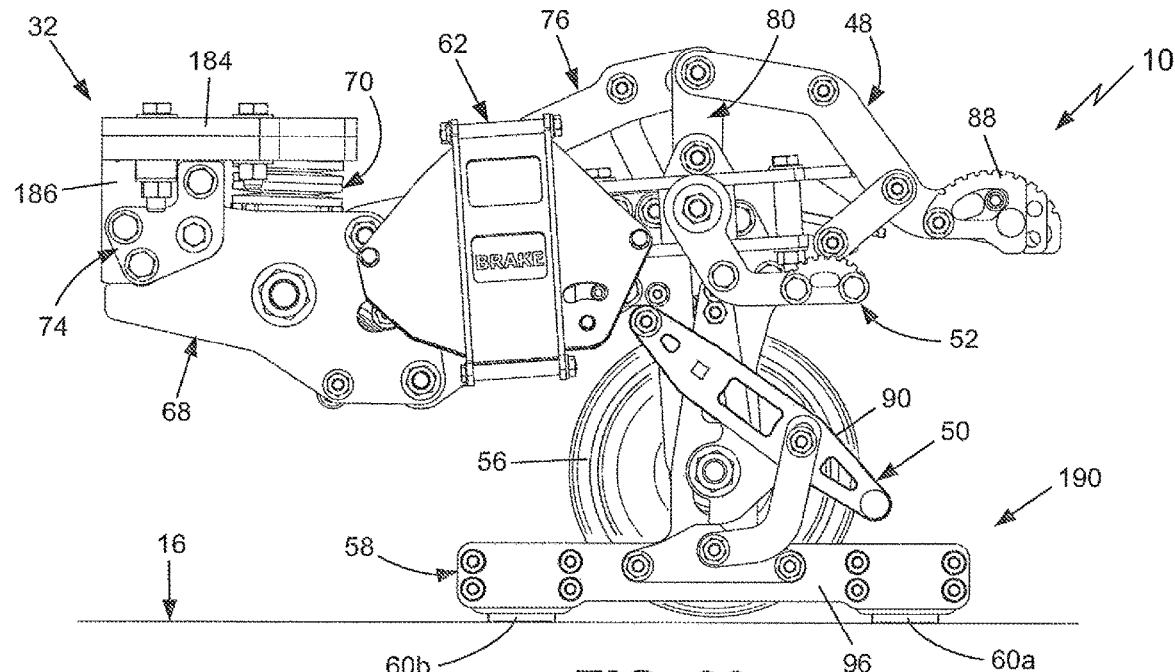
FIG. 28 is a right side view of the braking and steering apparatus of FIG. 17 showing the brake pads of the brake assembly down against the surface placing the brake assembly in its down but not in its locked condition.
Figure 29:
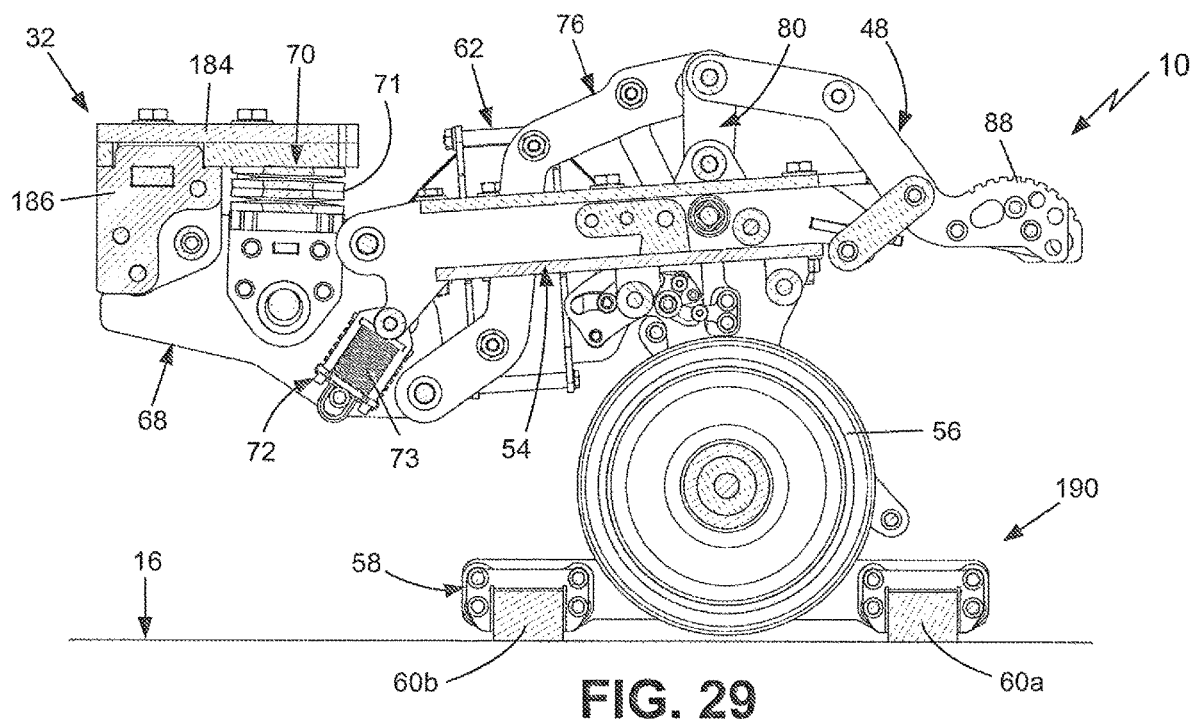
FIG. 29 is a right side view of the braking and steering apparatus of FIG. 28 showing a cross-sectional layer toward the reader cut out of the apparatus.
Figure 30:
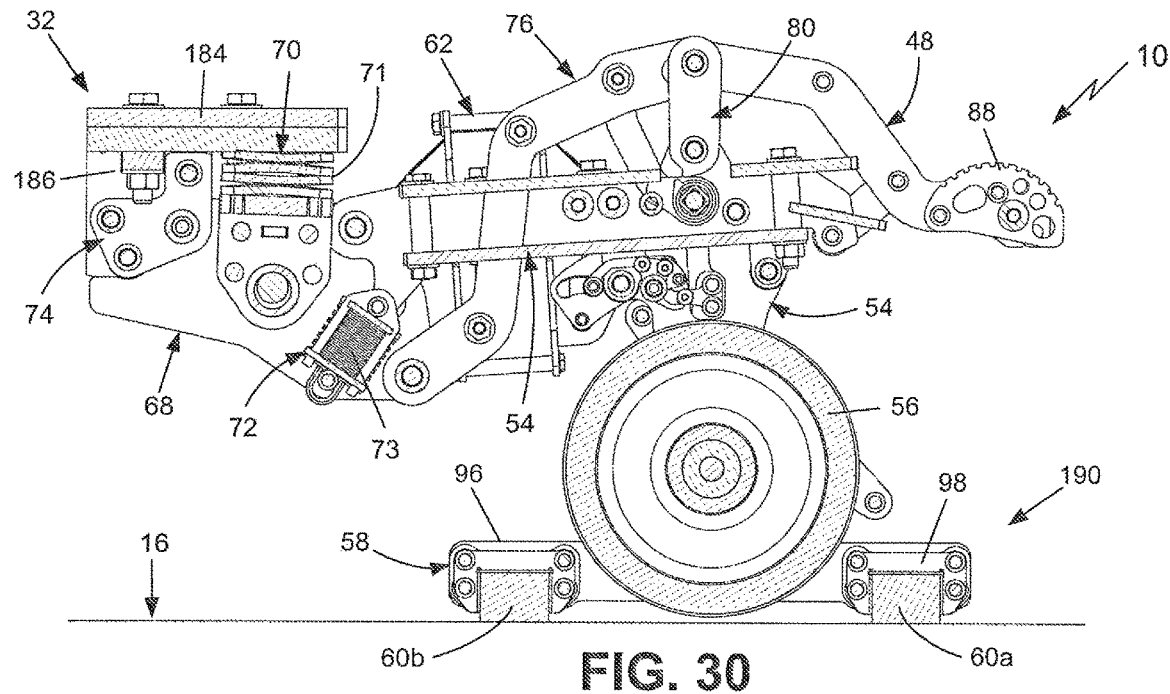
FIG. 30 is a right side view of the braking and steering apparatus of FIG. 29 showing a deeper cross-sectional layer cut out of the apparatus.
Figure 31:
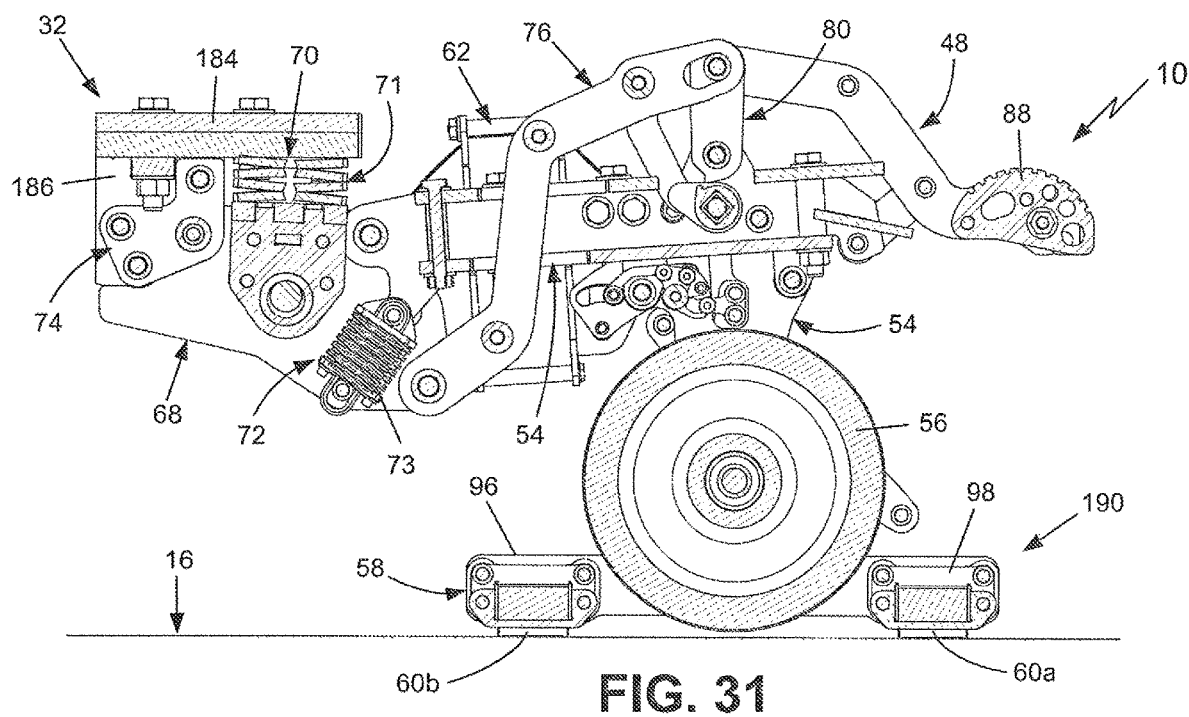
FIG. 31 is a right side view of the braking and steering apparatus of FIG. 30 showing a deeper cross-sectional layer cut out of the apparatus.
Figure 32:
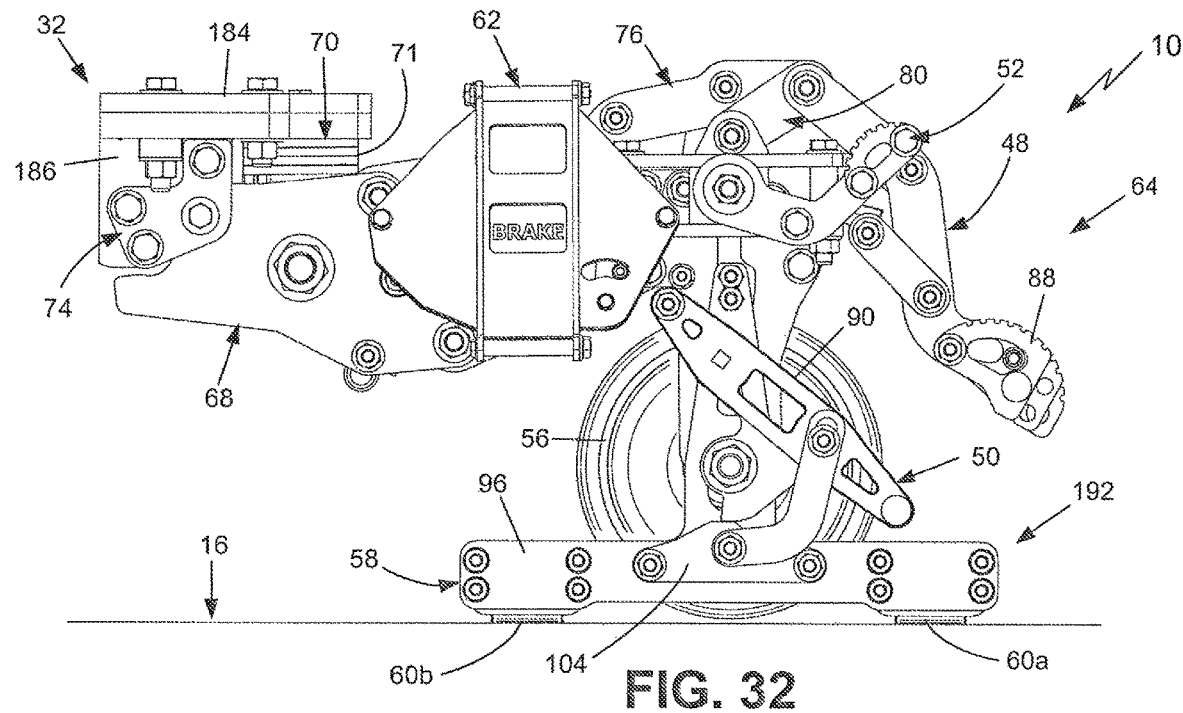
FIG. 32 is a right side view of the braking and steering apparatus of FIG. 18 showing the brake pads of the brake assembly pressed down against the surface in its fully locked position placing the apparatus in its fully locked condition.
Figure 33:
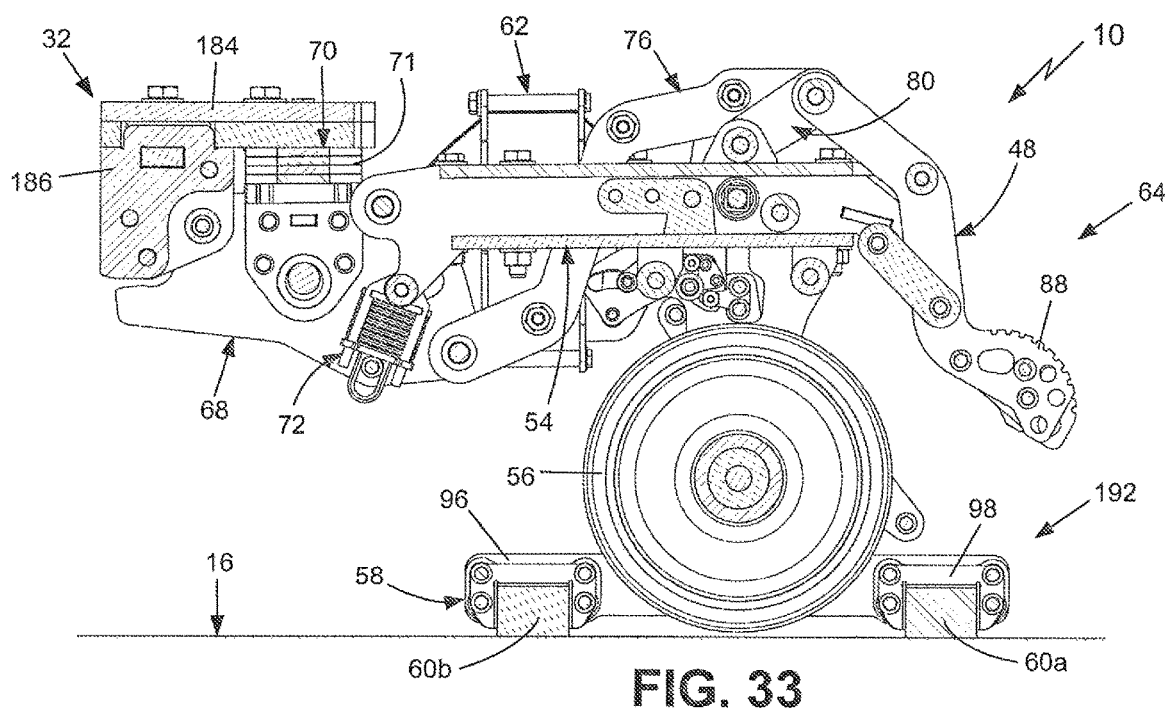
FIG. 33 is a right side view of the braking and steering apparatus of FIG. 32 showing a cross-sectional layer toward the reader cut out of the apparatus.
Figure 34:
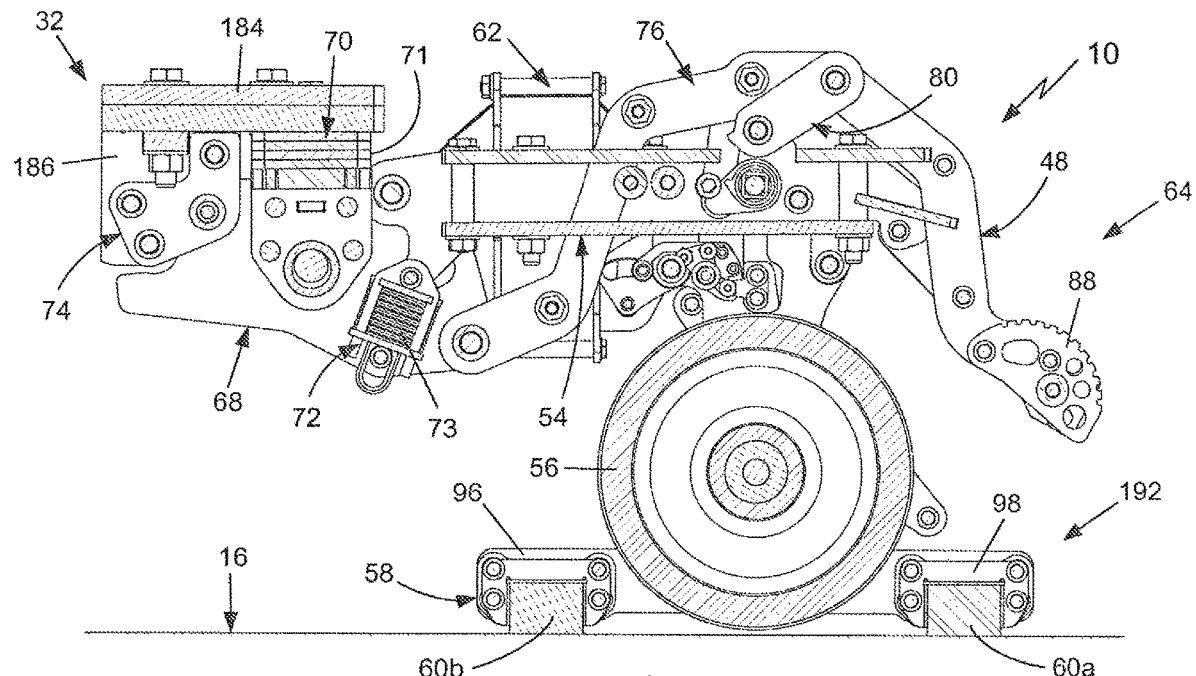
FIG. 34 is a right side view of the braking and steering apparatus of FIG. 33 showing a deeper cross-sectional layer cut out of the apparatus.
Figure 35:
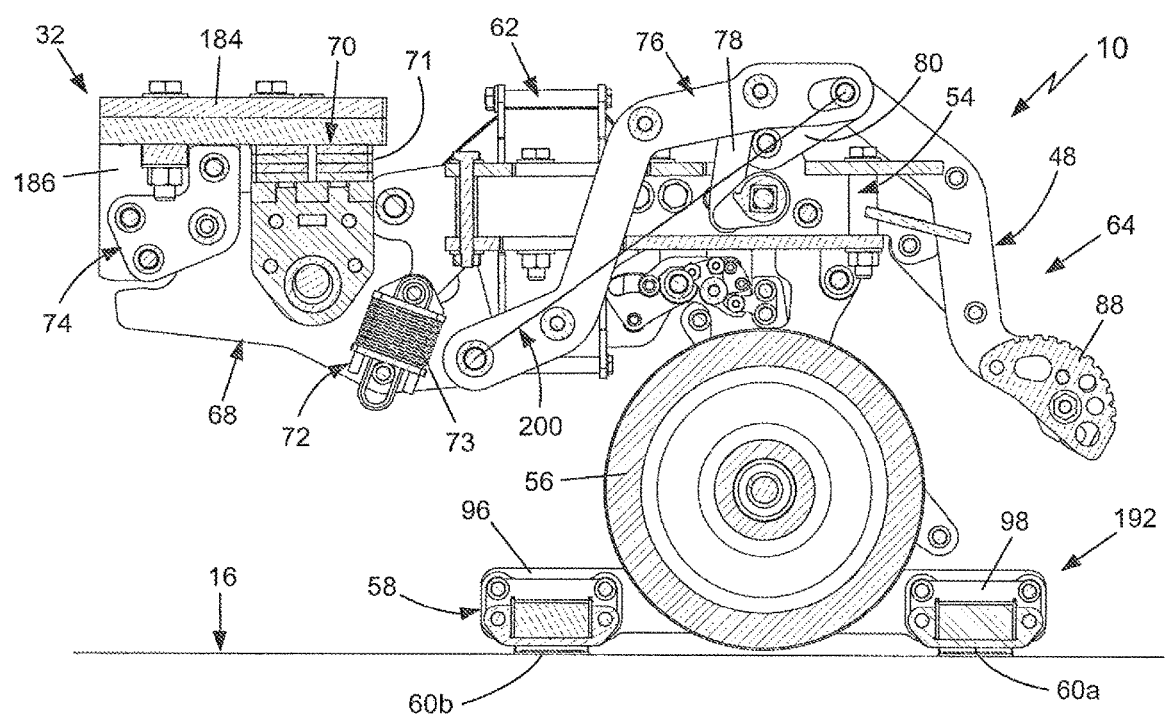
FIG. 35 is a right side view of the braking and steering apparatus of FIG. 34 showing a deeper cross-sectional layer cut out of the apparatus with a line added to show the over-center orientation of the application linkage that holds the action arm and reaction arm in a set position to secure the brake assembly in its fully locked condition.
Figure 36:
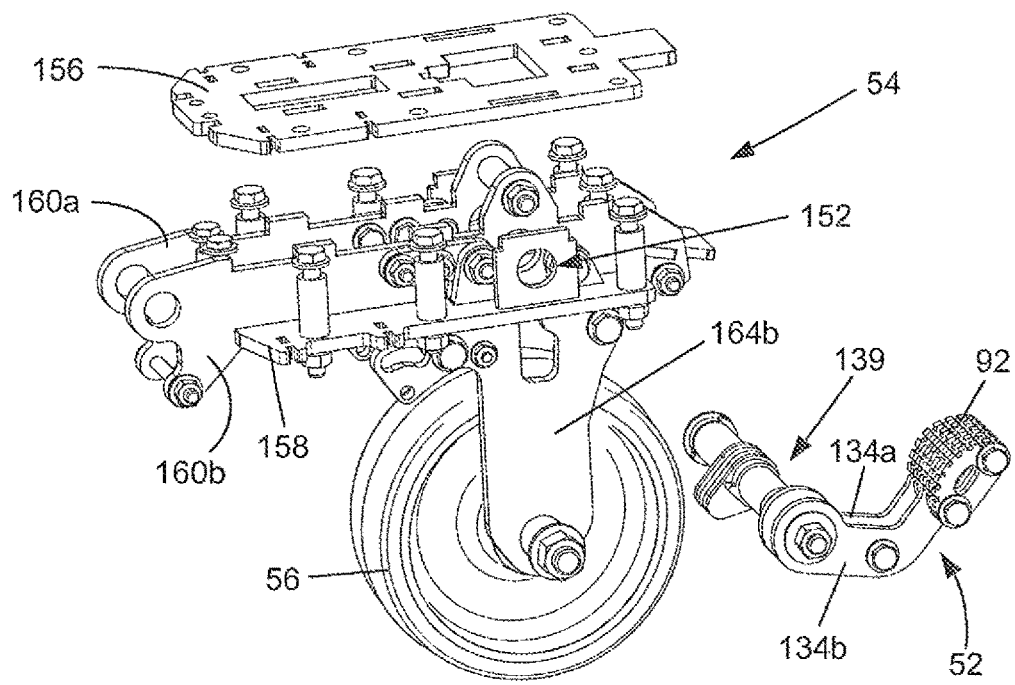
FIG. 36 is a partially exploded right side perspective view of the action arm with the release pedal assembly shown therewith.

As set forth above, pressing down on the release pedal 92 disengages either the braking condition 64 or the steering condition 66 by first releasing the engagement spring 71 to release pressure against the surface 16. With the help of the return spring 73, the release pedal assembly 52 lifts and locks the floor engagement group, namely the wheel 56 and brake assembly 58, up off the floor or other surface 16. The over-center lever and lock linkage operation cooperates with the engagement spring 71 and the return spring 73 to hold or release downward pressure of the wheel 56 or the brake assembly 58. The over-center lever and lock linkage also raises and lowers the floor engagement group. As shown in FIG. 26, having line 198 showing component relative positioning, the over-center orientation of the application pedal assembly 48, tension application link 76 and release link 78 holds the action arm assembly 54 and brake assembly 58 of the apparatus 10 in the fully released position 188. In FIG. 35, line 200 shows the over-center orientation of the tension application link 76 and the compression application link 80 holding the apparatus 10 in its fully locked position 192. As will be readily appreciated by persons who are skilled in the relevant art, use of the over-center leverage applied by the relevant components when the apparatus 10 is in the fully locked position 192 provides much greater downward force than the down force required to be applied by the user 18. In one configuration, apparatus 10 results in over a thousand pounds of down force on the wheel 56 or on the brake pads 60, depending on whether the apparatus 10 is in, respectively, the steering condition 66 or the braking condition 64, while requiring the user 18 to apply less than one hundred pounds of down force on the application pedal 88.

In some uses, the object 12 can have two apparatuses 10 mounted diagonally from each other, with the trailing control group 46 being disengaged with either the braking condition 64 or the steering condition 66 at the ready so the object 12 can be easily and confidently maneuvered, even with large, heavy and/or sensitive objects 12 without strain or risk of losing control. To make things easier and more precise, the wheel 56 of the lead apparatus 10 provides a type of pivot axis to allow the user 18 to easily and accurately align the object 12 towards its next heading, thereby allowing the object 12 to be easily positioned precisely where it needs to be positioned with low risk of injury, material loss and/or damage to the object and other objects.

In the preferred configuration of the new apparatus 10 of the present invention is made entirely of common off the shelf components, and inexpensive lasered, jetted, or chopped material without the need for any welding, machining, or other expensive forming operations to combine the components into the apparatus 10. The ease of manufacturing also applies to the brake pads 60*a*/60*b* of the brake assembly 58, where the rubber thereof can be sawed (radial arm) from bar stock, or easily molded if desired. The preferred configuration also provides slotted holes in the outer plates of the brake beam 96 that allow the user 16 to adjust the position of the brake pads 60*a*/60*b*. As will be readily appreciated by persons who are skilled in the relevant art, the present invention provides a new braking and steering control apparatus 10 which can be relatively easily and inexpensively and assembled without the need for expensive skilled labor, all of which will reduce the cost of the apparatus 10 and allow widespread use thereof.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor and to enable other persons who are skilled in the relevant art to be able to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A braking and steering control apparatus to secure or move an object on a surface, the object moveably supported on the surface by a wheel assembly, said apparatus comprising:
   an action arm assembly rotatably supporting a wheel configured to engage and roll on the surface when said apparatus is in a steering condition to assist with moving the object on the surface;
   a control group operatively connected to said action arm assembly and positioned so as to define a first end of said apparatus, said control group having a plurality of pedals operatively connected to said action arm assembly to selectively place said apparatus in one of said steering condition and a braking condition;
   a reaction arm interconnecting said action arm assembly with at least one of the object and the wheel assembly at a second end of said apparatus, said action arm assembly pivotally connected to said reaction arm;
   an engagement spring assembly attached to said reaction arm and configured to bias said reaction arm downward to position said apparatus for being placed in one of said steering condition and said braking condition; and
   a brake assembly attached to said action arm assembly and pivotally connected to said control group, said brake assembly configured to engage the surface and prevent movement of said apparatus and the object on the surface when said apparatus is in said braking condition and said apparatus is associated with said object,
   wherein each said plurality of pedals are pivotally connected to said action arm assembly to raise and lower said action arm assembly and each of said wheel and said braking assembly to select one of said steering condition and said braking condition, to apply a downward force to said brake assembly to place said apparatus in said braking condition with said brake assembly in a fully locked position, and to raise or lower said brake assembly relative to said wheel to place said apparatus in one of said steering condition and said braking condition.

2. The apparatus of claim 1 further comprising a return spring assembly interconnecting said action arm assembly and said reaction arm, said return spring assembly having a return spring configured to bias said action arm assembly relative to said reaction arm so as to pivot said action arm assembly generally upward away from the surface when said apparatus is in neither of said steering condition nor said braking condition and generally downward toward the surface for placement of said apparatus in one of said steering condition and said braking condition.

3. The apparatus of claim 1, wherein said control group comprises an application pedal assembly, a selector lever assembly and a release pedal assembly that are each pivotally connected to said action arm assembly and operatively configured to selectively place said apparatus in one of said steering condition and said braking condition.

4. The apparatus of claim 3, wherein said application pedal assembly is pivotally connected to said action arm assembly so as to raise and lower said action arm assembly and each of said wheel and said braking assembly, said selector lever assembly pivotally connected to said action arm assembly and configured to engage said brake assembly so as to apply a downward force thereto to place said apparatus in said braking condition with said brake assembly in said fully locked position, and said release pedal assembly is pivotally connected to each of said action arm assembly and said reaction arm to raise or lower said brake assembly relative to said wheel to select one of said steering condition and said braking condition.

5. The apparatus of claim 1, wherein said apparatus is structured and arranged to press said wheel against the surface when said apparatus is in said steering condition and to press one or more brake pads of said brake assembly against the surface when said apparatus is in said braking condition.

6. The apparatus of claim 1, wherein said control group has a selector lever assembly pivotally attached to said action arm assembly, said brake assembly and said selector lever assembly being cooperatively configured and positioned so said selector lever assembly will engage said brake assembly and press one or more brake pads thereof downward against the surface to secure said apparatus in said braking condition.

7. The apparatus of claim 6, wherein said brake assembly further comprises a brake beam pivotally attached to said action arm assembly and a pressure plate attached to or integral with said brake beam, said selector lever assembly structured and arranged to press down on said pressure plate to press said one or more brake pads against the surface.

8. The apparatus of claim 1 further comprising a tension application link pivotally interconnecting an application pedal assembly of said control group and each of said action arm assembly and said reaction arm.

9. The apparatus of claim 1 further comprising a connecting assembly attached to or integral with one of said apparatus, the object and the wheel assembly so as to allow a user to control the movement of the wheel assembly and/or the object on the surface.

10. The apparatus of claim 1 further comprising a selection position indicator supported on said action arm assembly and operatively connected to an indicator actuator associated with said brake assembly, said selection position indicator structured and arranged to indicate that said apparatus is in one of said braking condition and said steering condition.

11. The apparatus of claim 1 further comprising a plurality of levers and a plurality of links that are operatively configured to cooperate with said control group and said brake assembly so as to utilize over-the-center positioning of one or more of said plurality of levers and said plurality of links to secure said brake assembly in one of a fully released position for movement of said apparatus on the surface when said apparatus is in said steering condition and a fully locked position for securing said apparatus on the surface when said apparatus is in said braking condition.

12. A braking and steering control apparatus to secure or move an object on a surface, the object moveably supported on the surface by a wheel assembly, said apparatus comprising:
   an action arm assembly rotatably supporting a wheel configured to engage and roll on the surface when said apparatus is in a steering condition to assist with moving the object on the surface;
   a control group operatively connected to said action arm assembly and positioned so as to define a first end of said apparatus, said control group having an application pedal assembly, a selector lever assembly and a release pedal assembly that are each pivotally connected to said action arm assembly and operatively configured to selectively place said apparatus in one of said steering condition and said braking condition;
a reaction arm at a second end of said apparatus, said reaction arm interconnecting said action arm assembly with at least one of the object and the wheel assembly, said action arm assembly pivotally connected to said reaction arm;
a tension application link pivotally interconnecting said application pedal assembly of said control group and each of said action arm assembly and said reaction arm;
an engagement spring assembly attached to said reaction arm and configured to bias said reaction arm downward to position said apparatus for being placed in one of said steering condition and said braking condition; and
a brake assembly attached to said action arm assembly and pivotally connected to said control group, said brake assembly configured to engage the surface and prevent movement of said apparatus and the object on the surface when said apparatus is in said braking condition and said apparatus is associated with said object,
wherein said application pedal assembly is pivotally connected to said action arm assembly and said tension application link so as to raise and lower said action arm assembly and each of said wheel and said braking assembly therewith relative to said reaction arm assembly to select one of said steering condition and said braking condition, said selector lever assembly is pivotally connected to said action arm assembly and configured to engage said brake assembly so as to apply a downward force thereto to place said apparatus in said braking condition with said brake assembly in a fully locked position, and said release pedal assembly is pivotally connected to each of said action arm assembly and said tension application link to raise or lower said brake assembly relative to said wheel to place said apparatus in one of said steering condition and said braking condition.

13. The apparatus of claim 12, wherein said brake assembly further comprises a brake beam pivotally attached to said action arm assembly and a pressure plate attached to or integral with said brake beam, said selector lever assembly structured and arranged to press down on said pressure plate to press said one or more brake pads against the surface.

14. The apparatus of claim 12 further comprising a connecting assembly attached to or integral with one of said apparatus, the object and the wheel assembly so as to allow a user to control the movement of the wheel assembly and/or the object on the surface.

15. The apparatus of claim 12 further comprising a selection position indicator supported on said action arm assembly and operatively connected to an indicator actuator associated with said brake assembly, said selection position indicator structured and arranged to indicate that said apparatus is in one of said braking condition and said steering condition.

16. The apparatus of claim 12 further comprising a plurality of levers and a plurality of links that are operatively configured to cooperate with said control group and said brake assembly so as to utilize over-the-center positioning of one or more of said tension application link, said plurality of levers and said plurality of links to secure said brake assembly in one of a fully released position for movement of said apparatus on the surface when said apparatus is in said steering condition and said fully locked position for securing said apparatus on the surface when said apparatus is in said braking condition.

17. The apparatus of claim 12 further comprising a return spring assembly interconnecting said action arm assembly and said reaction arm, said return spring assembly having a return spring configured to bias said action arm assembly relative to said reaction arm so as to pivot said action arm assembly generally upward away from the surface when said apparatus is in neither of said steering condition nor said braking condition and generally downward toward the surface for placement of said apparatus in one of said steering condition and said braking condition.

18. A braking and steering control apparatus to secure or move an object on a surface, the object moveably supported on the surface by a wheel assembly, said apparatus comprising:
an action arm assembly rotatably supporting a wheel configured to engage and roll on the surface when said apparatus is in a steering condition to assist with moving the object on the surface;
a control group operatively connected to said action arm assembly and positioned so as to define a first end of said apparatus, said control group having an application pedal assembly, a selector lever assembly and a release pedal assembly that are each pivotally connected to said action arm assembly and operatively configured to selectively place said apparatus in one of said steering condition and a braking condition that secures the object on the surface so as to prevent movement of the object;
a reaction arm at a second end of said apparatus, said reaction arm interconnecting said action arm assembly with at least one of the object and the wheel assembly, said action arm assembly pivotally connected to said reaction arm;
an engagement spring assembly having an engagement spring, said engagement spring assembly attached to said reaction arm so as to dispose said engagement spring between said reaction arm and one of the object and the wheel assembly, said engagement spring configured to bias said reaction arm downward to position said apparatus for being placed in one of said steering condition and said braking condition;
a return spring assembly interconnecting said action arm assembly and said reaction arm, said return spring assembly having a return spring configured to bias said action arm assembly relative to said reaction arm so as to pivot action arm assembly generally upward away from the surface and generally downward toward the surface for placement of said apparatus in one of said steering condition and said braking condition;
a tension application link pivotally interconnecting said reaction arm and said application pedal assembly;
a brake assembly attached to said action arm assembly and pivotally connected to said selector lever assembly, said brake assembly having one or more brake pads configured to engage the surface and prevent movement of said apparatus and the object on the surface when said apparatus is in said braking condition and said apparatus is associated with said object, said selector lever assembly configured to engage said brake assembly to press said brake pads downward against the surface to secure said apparatus in said braking condition; and
a selection position indicator supported on said action arm assembly and operatively connected to a selection position indicator actuator associated with said brake assembly, said selection position indicator structured and arranged to indicate that said apparatus is in one of said braking condition and said steering condition, wherein said application pedal assembly is pivotally connected to said action arm assembly and said tension application link so as to raise and lower said action arm assembly and each of said wheel and said braking assembly therewith relative to said reaction arm assembly to select one of said steering condition and said braking condition, said selector lever assembly is pivotally connected to said action arm assembly and configured to engage said brake assembly so as to apply a downward force thereto to place said apparatus in said braking condition with said brake assembly in a fully locked position, and said release pedal assembly is pivotally connected to each of said action arm assembly and said tension application link to raise or lower said brake assembly relative to said wheel to place said apparatus in one of said steering condition and said braking condition.

19. The apparatus of claim 18 further comprising a plurality of levers and a plurality of links that are operatively configured to cooperate with said control group and said brake assembly so as to utilize over-the-center positioning of one or more of said tension application link, said plurality of levers and said plurality of links to secure said brake assembly in one of a fully released position for movement of said apparatus on the surface when said apparatus is in said steering condition and said fully locked position for securing said apparatus on the surface when said apparatus is in said braking condition.

20. The apparatus of claim 18 further comprising a connecting assembly attached to or integral with one of said apparatus, the object and the wheel assembly so as to allow a user to control the movement of the wheel assembly and/or the object on the surface.

* * * * *